Aug. 29, 1950     T. A. CONLON ET AL     2,520,118
MOBILE HEAVY ORDNANCE
Filed July 25, 1945     10 Sheets-Sheet 1
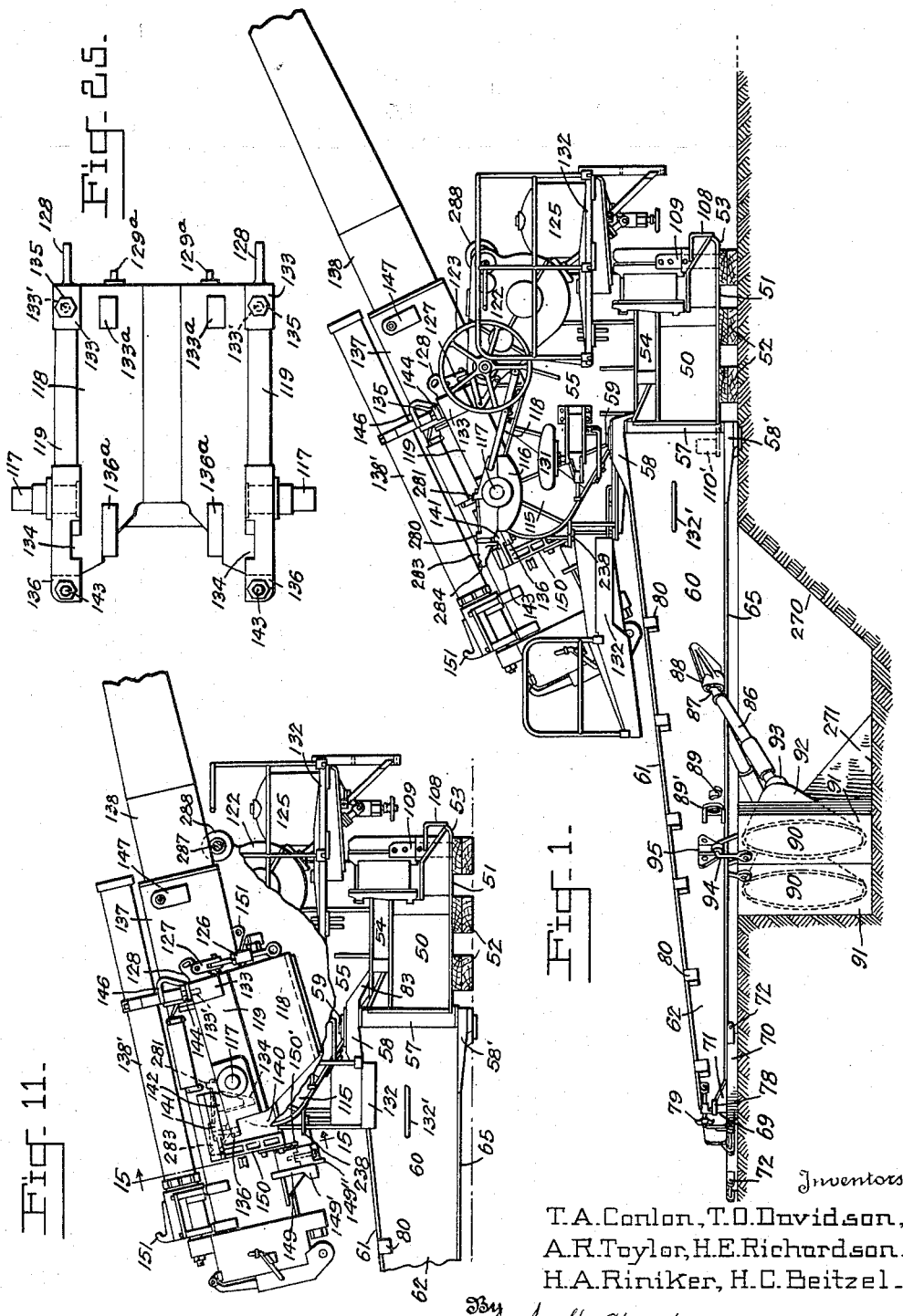
Inventors
T.A.Conlon, T.O.Davidson,
A.R.Taylor, H.E.Richardson,
H.A.Riniker, H.C.Beitzel
By J. H. Church & W. E. Thibodeau
Attorneys

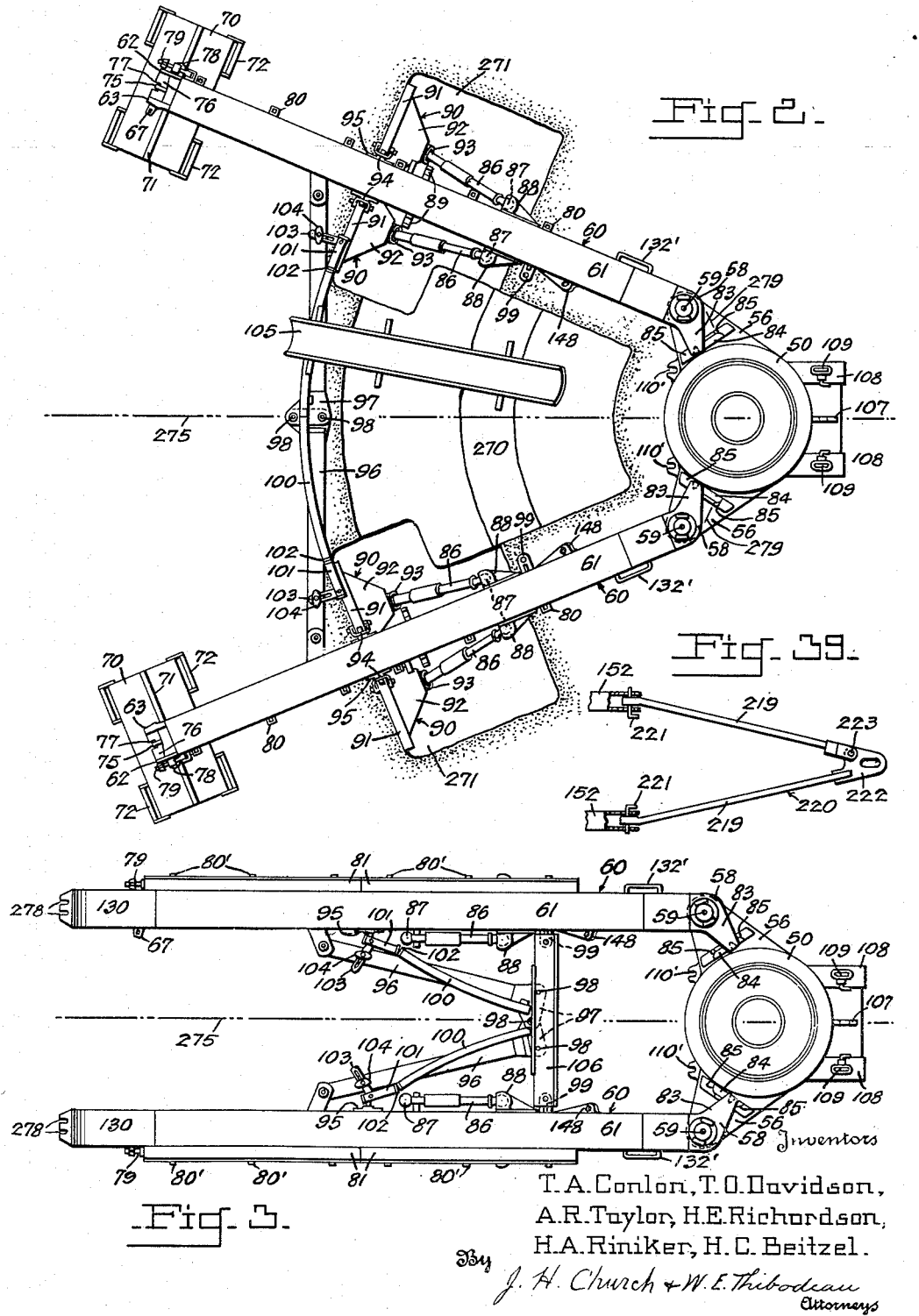

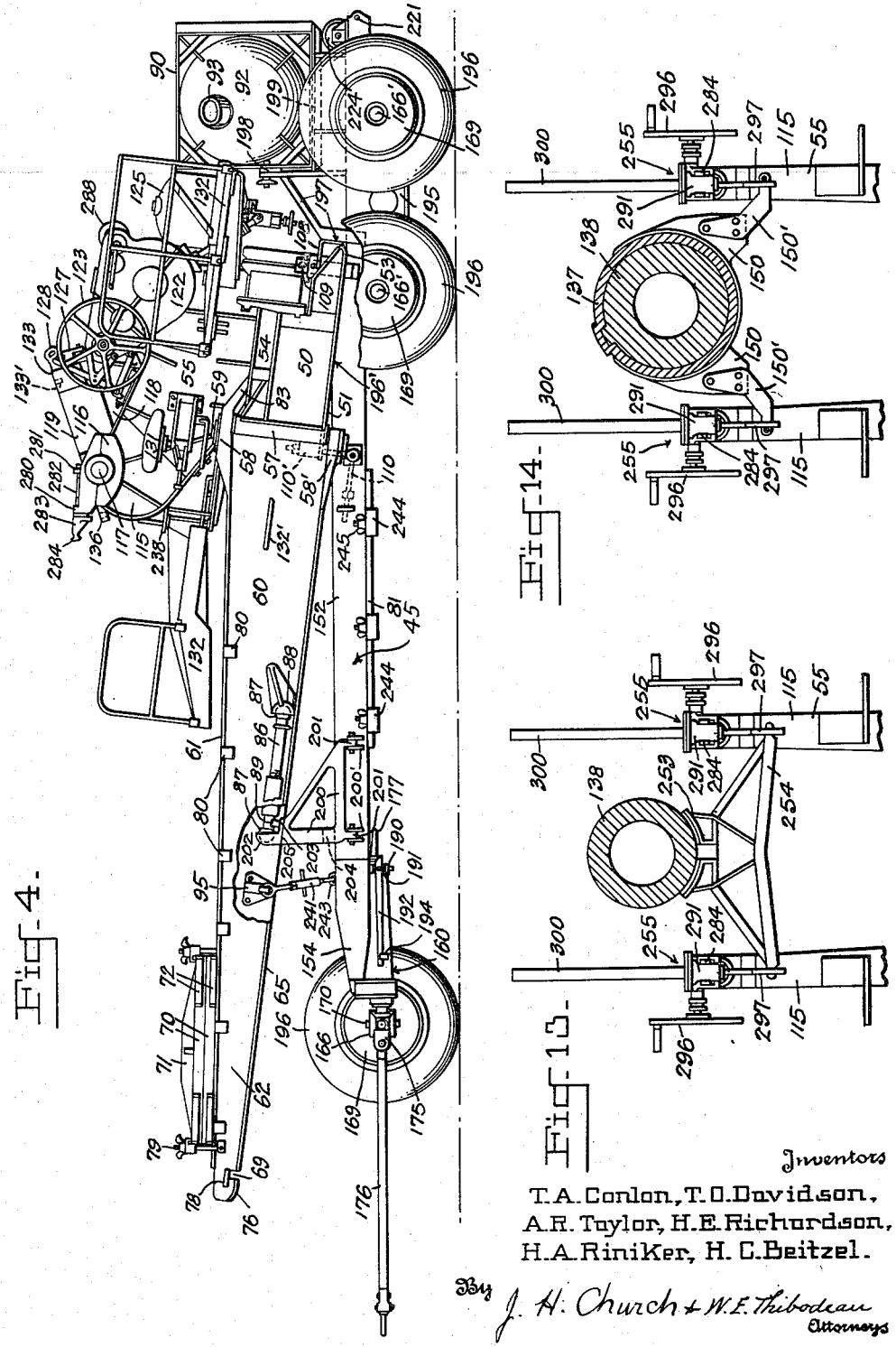

Aug. 29, 1950 T. A. CONLON ET AL 2,520,118
MOBILE HEAVY ORDNANCE
Filed July 25, 1945 10 Sheets-Sheet 4
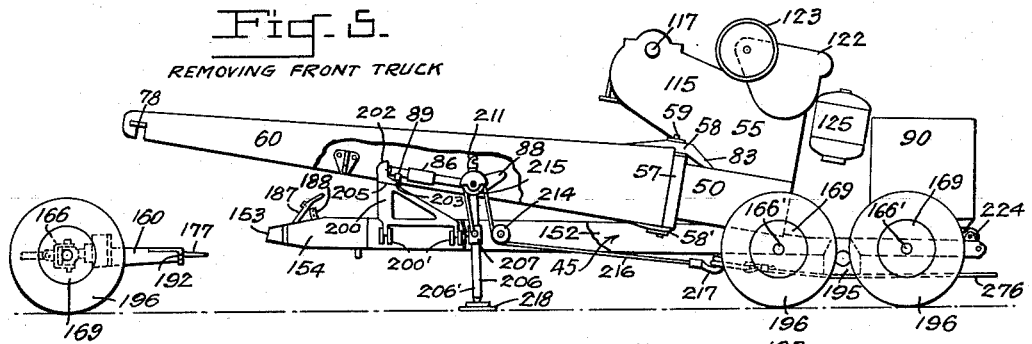
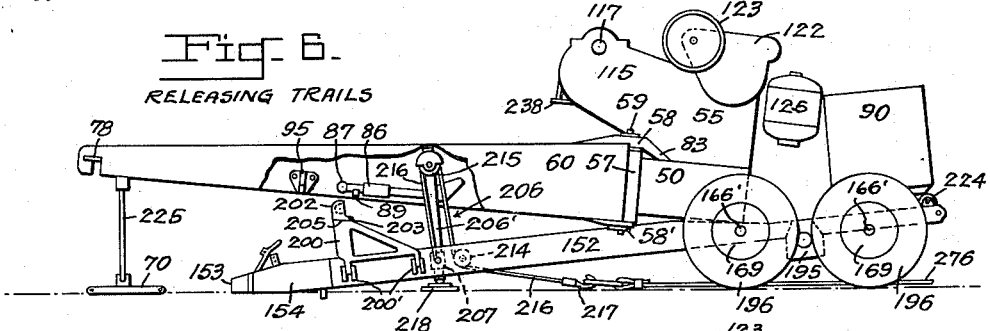
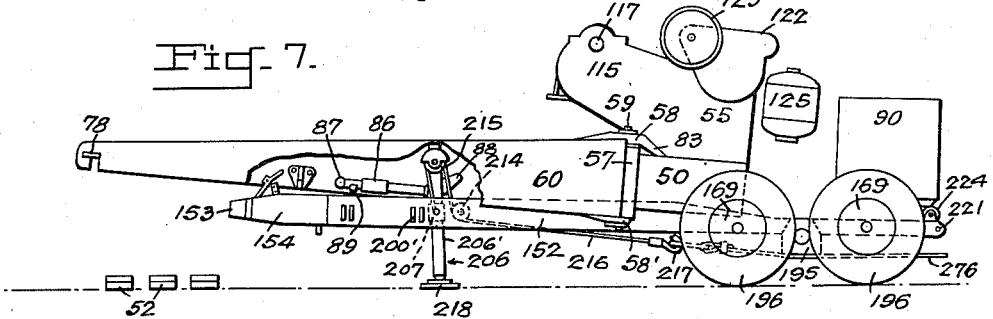
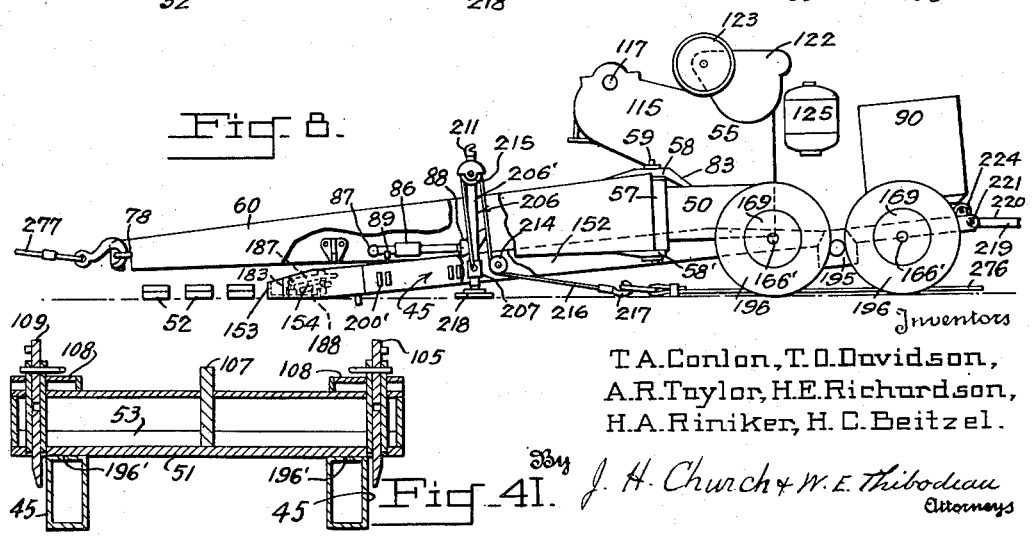
Inventors
T.A.Conlon, T.O.Davidson,
A.R.Taylor, H.E.Richardson,
H.A.Riniker, H.C.Beitzel.
By J. H. Church & W. E. Thibodeau
Attorneys Aug. 29, 1950
T. A. CONLON ET AL
2,520,118
MOBILE HEAVY ORDNANCE
Filed July 25, 1945
10 Sheets-Sheet 5
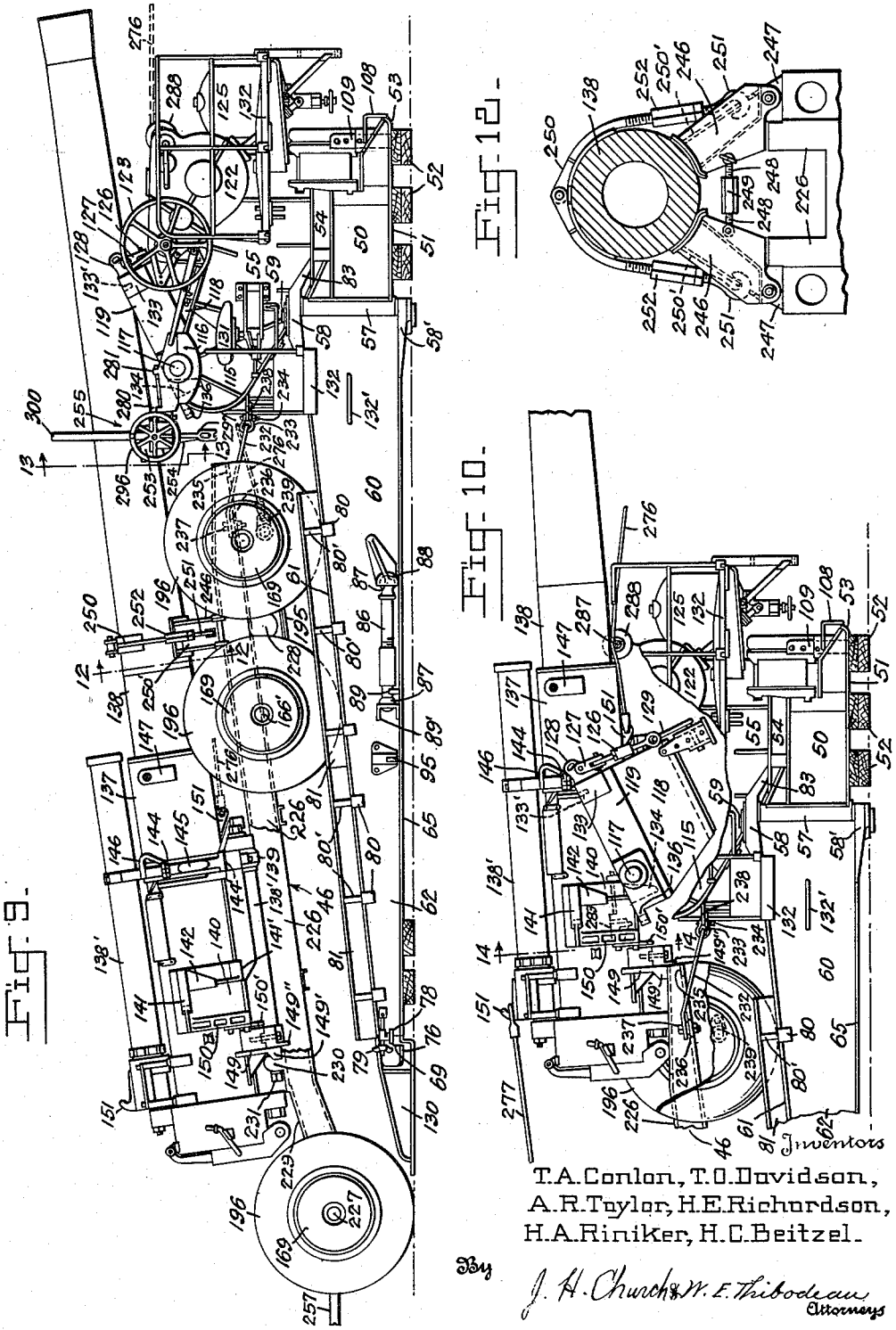
Inventors
T.A.Conlon, T.O.Davidson,
A.R.Taylor, H.E.Richardson,
H.A.Riniker, H.C.Beitzel.
By J. H. Church & W. F. Thibodeau
Attorneys

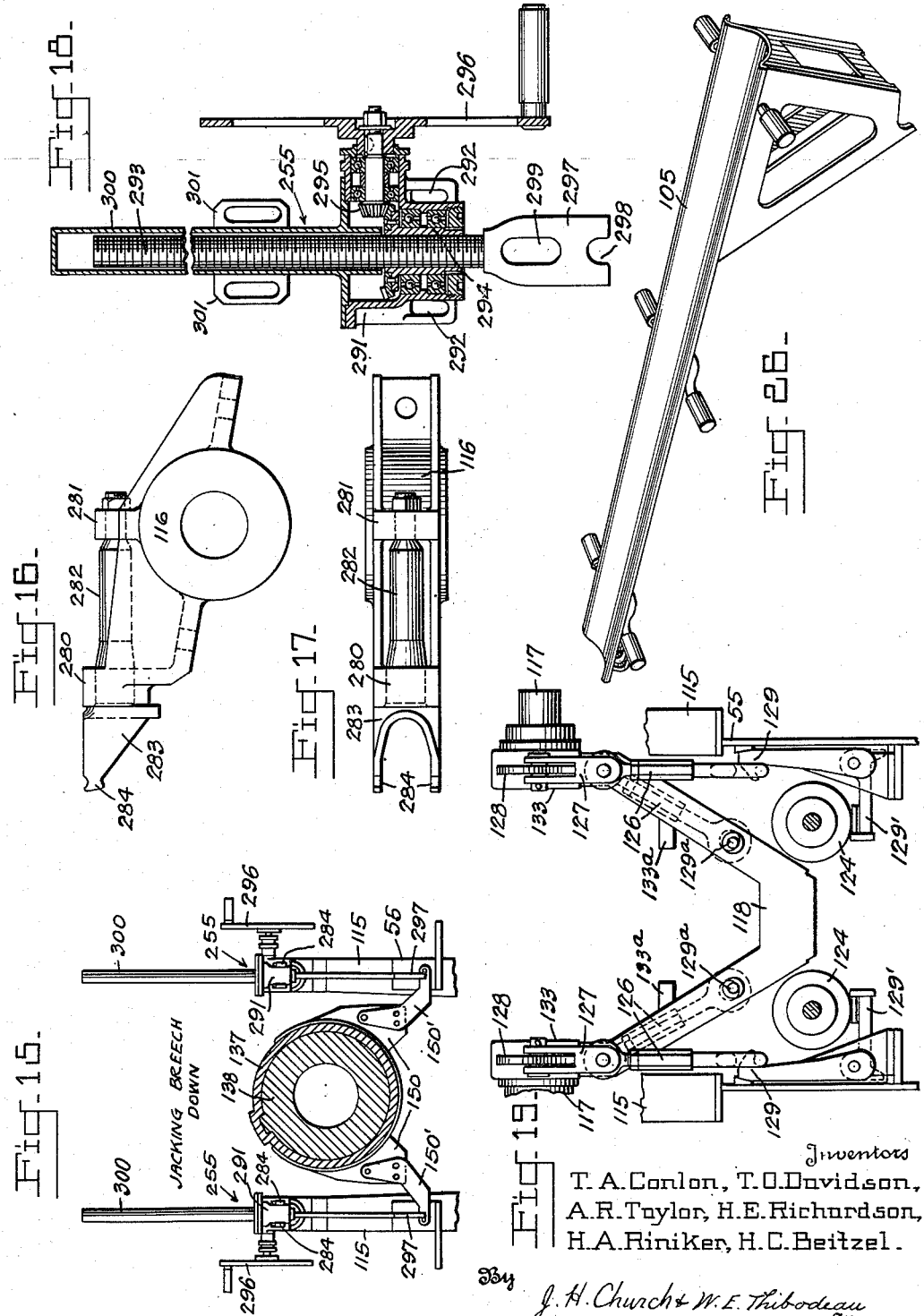

Aug. 29, 1950 T. A. CONLON ET AL 2,520,118
MOBILE HEAVY ORDNANCE
Filed July 25, 1945 10 Sheets-Sheet 7
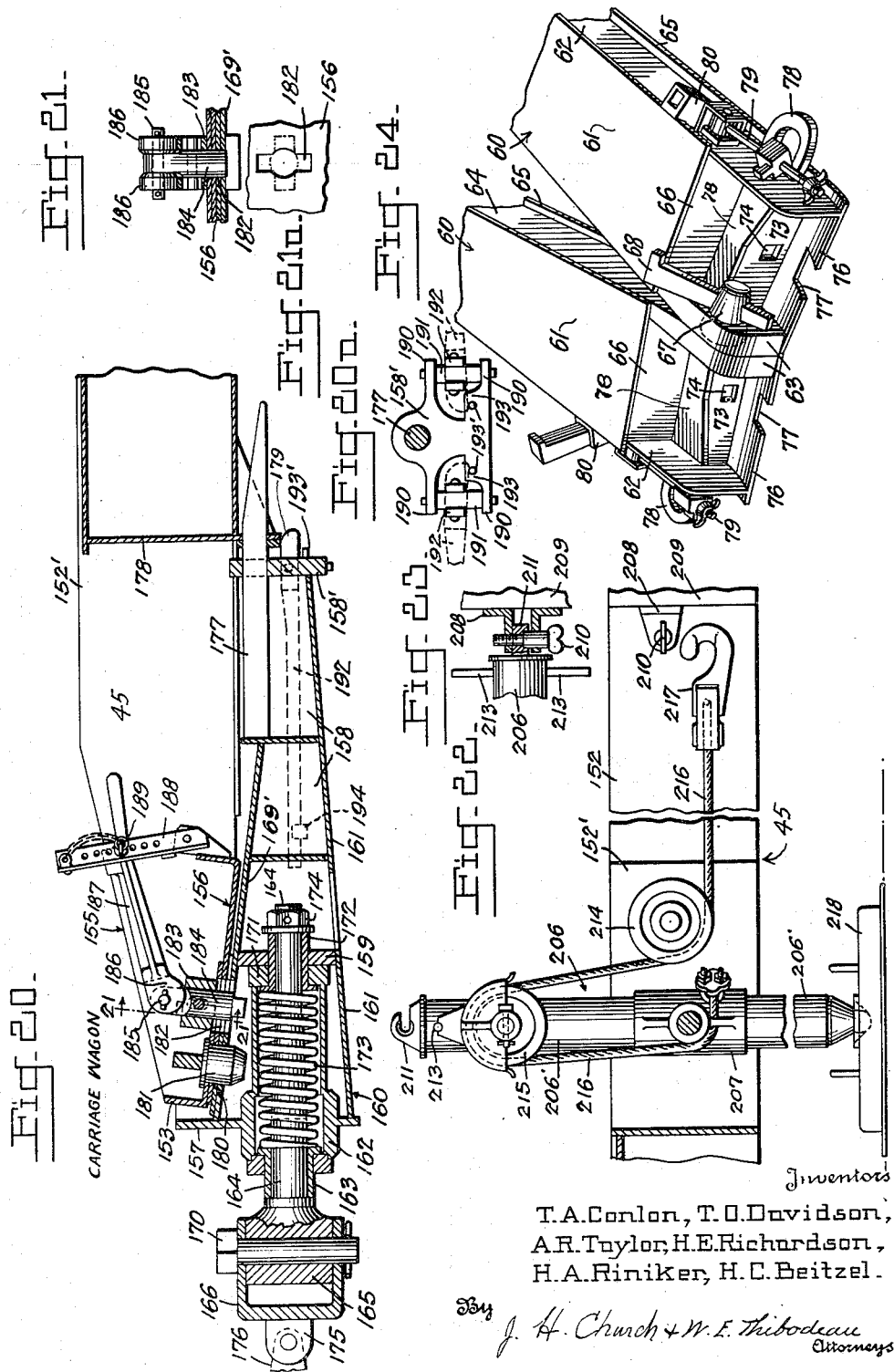
Inventors
T. A. Conlon, T. O. Davidson,
A. R. Taylor, H. E. Richardson,
H. A. Riniker, H. C. Beitzel.
By J. H. Church & W. E. Thibodeau
Attorneys Aug. 29, 1950   T. A. CONLON ET AL   2,520,118
MOBILE HEAVY ORDNANCE
Filed July 25, 1945   10 Sheets-Sheet 8
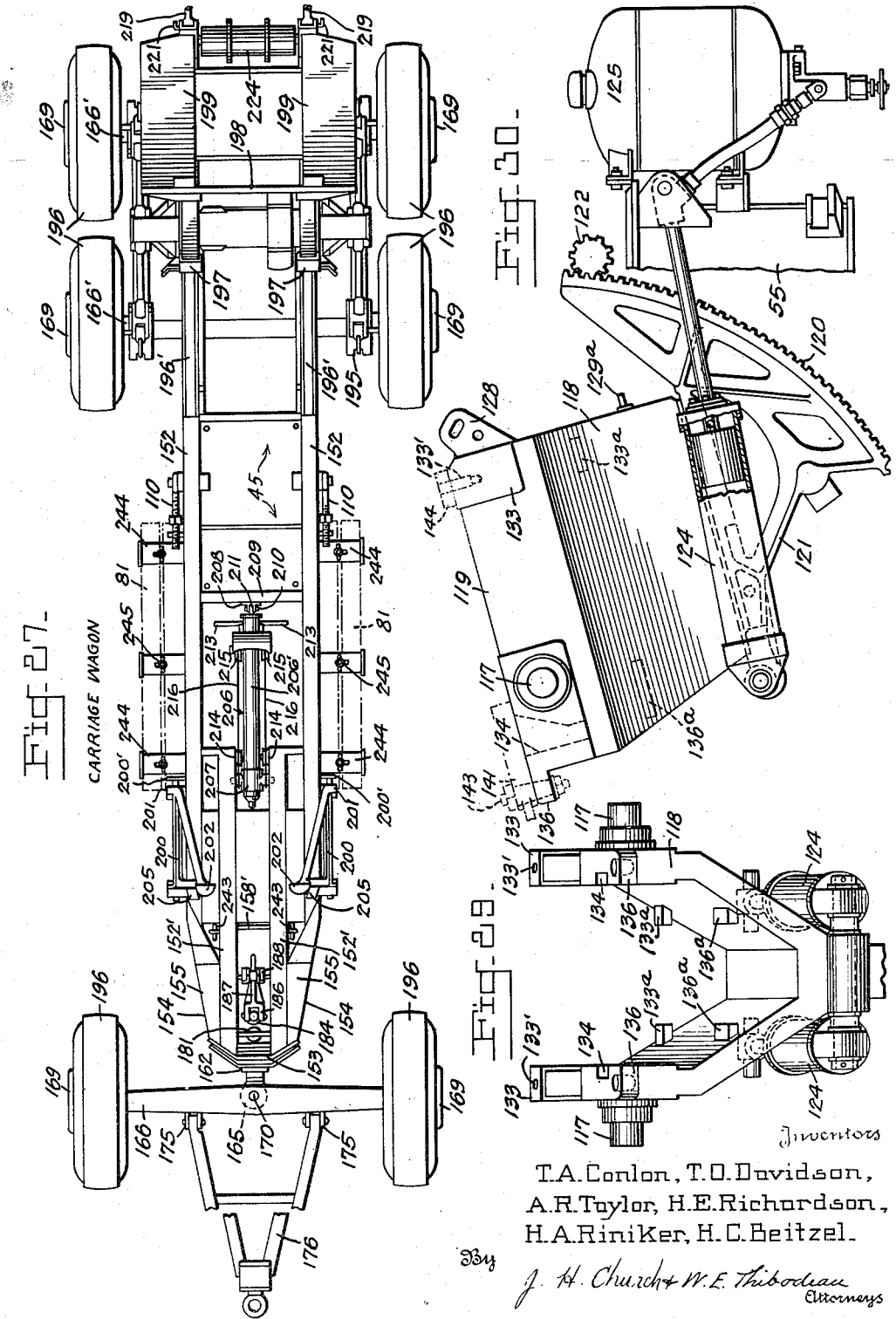
Inventors
T.A.Conlon, T.O.Davidson,
A.R.Taylor, H.E.Richardson,
H.A.Riniker, H.C.Beitzel.
By
J. H. Church & W. E. Thibodeau
Attorneys Aug. 29, 1950     T. A. CONLON ET AL     2,520,118
MOBILE HEAVY ORDNANCE
Filed July 25, 1945     10 Sheets-Sheet 9
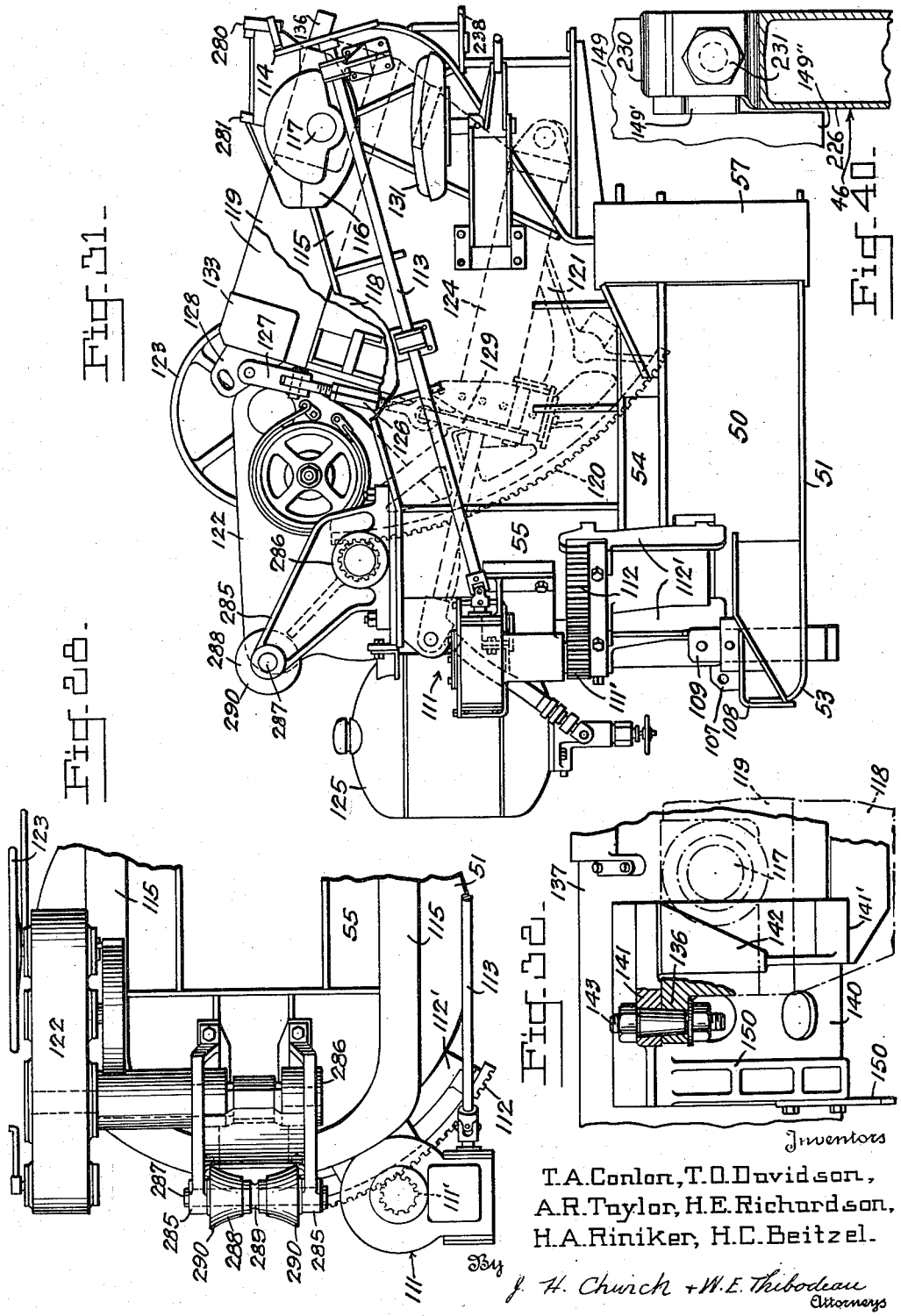
Inventors
T.A.Conlon, T.O.Davidson,
A.R.Taylor, H.E.Richardson,
H.A.Riniker, H.C.Beitzel.
By J. H. Church + W.E. Thibodeau
Attorneys

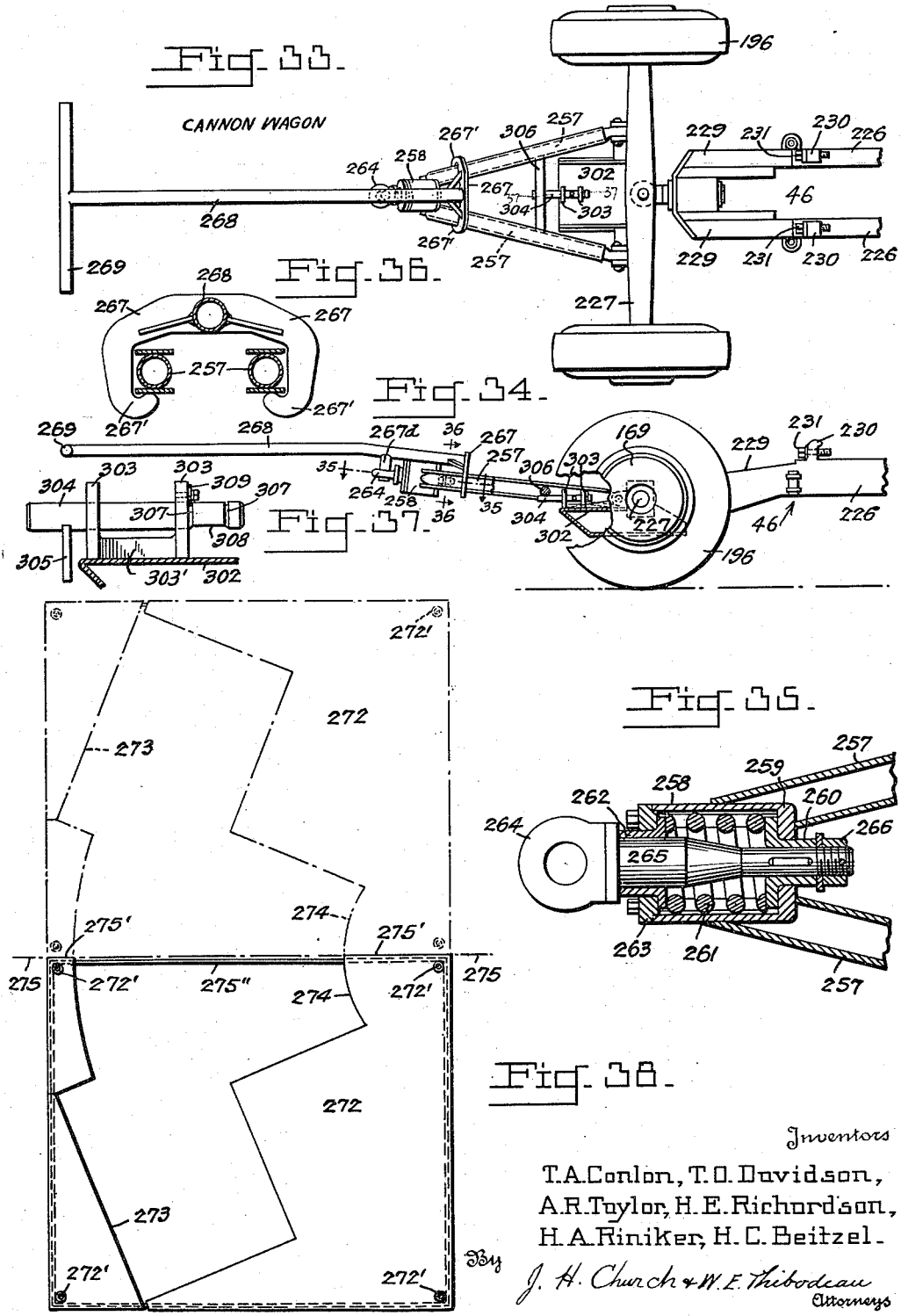

UNITED STATES PATENT OFFICE 2,520,118

MOBILE HEAVY ORDNANCE

Thomas A. Conlon, Silver Spring, Md., and Trevor O. Davidson and Allan R. Taylor, Milwaukee, and Harry E. Richardson, Hugo A. Riniker, and Horace C. Beitzel, South Milwaukee, Wis.

Application July 25, 1945, Serial No. 607,060

15 Claims. (Cl. 89—40)

The invention relates to mobile heavy ordnance, and particularly to means to enable the ready transport over ordinary highways of large caliber apparatus which has heretofore been limited in use to railway mounts because of the load limits of minor highway bridges and pavements and the practical limits of construction of wheeled transport traffic conditions, and various maneuvering limitations.

Present developments of warfare have accentuated the need for ordnance of the heaviest caliber close to the open front (whereas it was previously used only in seige operations), and while in the war of 1914-1918 railway carriages and extensible footings were developed as mounts, and used with good effect, in the present war the more extensive destruction of communications, high concentrations of cannon and need for rapid assembly and coordination with other arms of the largest caliber cannon have imposed on the Ordnance Department the necessity of meeting a demand for heavy cannon and material which will not be dependent on rail transportation, but may be made part of a locomotive highway unit, or may be close-coupled to prime movers and in addition adapted to travel rapidly on average continental highways and into rough ground to a reasonable extent.

On account of the extensive use of heavy monolithic defensive works spotted or extending over large expanses of terrain in successive zones of great depth, there is a need for guns of heavy caliber such as siege pieces of eight or ten inches or more, capable of being rapidly moved into isolated situations and rapidly set up without need of special concrete foundations.

In meeting the practical requirements of the problem—including the limited strength of bridges and highway pavements, avoidance of objectionable road shocks to ordnance mechanisms, and practical limitations involved in reasonable weight and complexity of running gear, power plants and tractive elements—it is an object of the present invention to enable the distribution of the load and the provision of vehicular elements by which it may be carried with minimum risk of damage to highways or operative mechanism of the piece. To this end it is an aim to offer novel structure to enable the separation of a heavy gun unit into parts which may be readily and quickly assembled momently in the field and likewise displaced, and to provide wheeled supports for the separated parts readily movable by current prime mover forms of adequate speed and power capacities.

This end has been successfully attained, and contributing thereto it has been an essential requirement to devise means whereby need for expert mechanical services or special machines for the setting up and taking down of the piece is minimized, not alone to avoid mistakes, misadjustments, or damage, but to minimize the assembly operations and apparatus required in the field, and the time thereby involved. In consequence, it has been additionally an object to present a construction in which heavy essentially unitary parts of such ordnance will automatically interlock by simple positioning movements to transmit and oppose with security the principal forces developed incident to firing of the weapon, with a minimum use of fastenings.

It is a further important aim of the invention to devise jack structures peculiarly organized with the structural elements of the weapon and its transportation elements, to facilitate the emplacement operations; to remove largely the requirements of physical labor by the gun and assembly crew, and particularly to enable assembly and mounting of the parts by the use of common prime movers or man power.

A gun such as the 240 millimeter howitzer rearranged and adapted to use in accordance with this invention (as is illustrated herein) involves a total weight when set up, in the neighborhood of 75,000 pounds, and constitutes a long range, high muzzle velocity weapon of exceedingly high effectiveness. In the arranging of the weights involved for ready transportation under the limitations mentioned, it has been an object to enable the separation of the material into units each of which represents a practicable and safe load for average pavements and bridges of main highways available in terrain where operations requiring heavy ordnance may be found necessary.

While the number of such separable units is to a degree limited by the necessity for continuous connections of operative mechanisms which will necessarily extend across the unit junctions, the principles of construction here embodied may enable separations in greater number than have been specifically illustrated (where it has been found practicable to embody a seige type cannon such as an 8-inch gun or a 240 millimeter howitzer, in two separable parts in which the total weight of the arm and mount is nearly equally divided). The weight of the tube and jacket largely governs in the determination of the unit weight for the several parts, since a practicable division of the tube and jacket has not yet been developed. In such case the tube unit being the minimum, it was deemed unnecessary to make the other separable unit or units materially different in weight.

Also, as the average main highway structure will carry safely the tube unit, and only a few lateral highway bridges would require buttressing for such loads, it is considered that the small amount of such buttressing involved by using the tube load as a weight unit will be balanced by reduction of personnel, equipment, and set up time attained by using fewer separable units in the piece as a whole. It has therefore been an aim of the present invention to devise separable tube and carriage units in which a bottom or base carriage and a top carriage with a special cradle may together constitute the carriage unit, with a weight immaterially different from that of the tube unit, so that two transportation units will make up the entire emplacement.

In attaining a practicable means for putting the carriage unit on a wagon and removing the same to a simple earth footing, and then mounting the tube thereon, it has been an important aim to devise means whereby this may be attained without the arbitrary requirement of crane hoists or the like (although permitting the use of such when available), but enabling it to be effected by man power and winch expedients—without crane, adapted to be carried out in a safe manner by an average crew with usual tractors, couplings, and cables of small bulk readily carried in isolated places. In effecting emplacement in this manner it has been a further necessity and aim of the invention to embody a structure in the base carriage whereby the adequate rigidity of the gun support in relation to the earth may be quickly attained and it has been sought to present novel structure and method for lowering the center of gravity, and fixing the mount with the earth, to the end that the repose of the mount will be disturbed in a minimum degree by recoil forces.

Yet another aim of the invention comprises accommodation of the piece to ready loading by physical labor with a minimum number of men, and particularly to avoid requirement of excessive raising of ammunition.

There is an important attainment in view consisting in the arrangement and structural details enabling rapid manual coupling and uncoupling of massive elements while preserving a high degree of dependability and security in the placement as a whole.

In the setting up of the arm in open and often rough and unprepared ground, the invention contemplates a novel means and procedure in assuring a good anchorage, stabilizing and orienting of the piece, adapted to be carried out by men with a minimum of specialized training.

In the mounting of the tube, it has been a special concern and object to enable the elevation of this heavy part from its low level on a transport wagon to operative position on its trunnions in the carriage by a novel structure and procedure, which will minimize the apparatus required and expenditure of power necessary and peculiarly contribute to the safety of matériel and personnel involved in the movement of the parts in setting up and taking down, and in transit.

To this end it is a special aim to evolve a novel and valuable structural and coactive relation between trail parts of the base carriage and the wagon of the tube so that the trails may have a double function of serving in one position as an inclined plane element upon which a wagon may be run from a low level to a higher one bringing the tube into a position at carriage level, yet permitting subsequent function of the trails normally for a wide base buttressing and stabilizing of the carriage.

In respect to the placement of the tube on the carriage, with the attendant requirement of maintaining operative connections of recoil and counter-recoil devices, as well as traverse gearing and elevation gearing, it is a salient purpose to present a novel cradle structure meeting these requirements, so that setting and securement of the tube by simple means effects largely automatically the necessary connections.

Steps in carrying out the unloading of the parts from wagons, and installations thereof, and the order of procedure with these steps form novel features of invention, as will be apparent from the following disclosure.

An important attainment in view is to enable the loading of the separable transport units in such manner that excessively long wheel bases for the transport wagons will be avoided, and also difficulties due to extreme longitudinal projections of the loads avoided, enabling movement of the parts over undulations of surface and enabling practical hookups with commonly available prime movers.

Additional objects, advantages and features of invention reside in the construction, arrangement and combination of parts involved in the embodiment and in steps and method of procedure in practice of the invention, as may be more readily understood from the following description and draft, in which:

Figure 1 is a right hand side elevation of a typical weapon mounted and placed in firing position in accordance with this invention, as for instance a 240 millimeter howitzer, the gun being elevated above the minimum for which the piece is adapted, part of the tube being broken away.

Figure 2 is a plan view of the bottom carriage and trails in firing position;

Figure 3 is a similar view showing an initial installation position of the trails for ramp service;

Figure 4 is a side elevation of the carriage unit loaded on its wagon;

Figures 5, 6, 7 and 8 are similar views of stages of work in unloading the carriage from the wagon;

Figure 9 is a side view of the carriage emplaced, with the trails adjusted as in Fig. 3, and the cannon wagon in position thereon for unloading of the cannon unit on to the carriage;

Figure 10 is a similar view with the fore part of the wagon omitted, showing the cannon unit in the final stage of sliding movement on the wagon and barrel roller, before emplacement of the saddle and jack;

Figure 11 shows a succeeding stage in emplacement of the cannon unit, the wagon having been removed, the near side of the top carriage being broken away, and the saddle and jacks omitted for clarity of illustration;

Figure 12 is a cross section of the cannon and wagon at the tube supports on line 12—12 of Fig. 9;

Figure 13 is a similar view showing the saddle and jacks support for the tube during movement of the tube until rested on the tube roller, taken on the line 13—13 of Fig. 9;

Figure 14 is a similar view near the breech on the line 14—14 of Fig. 10, the breech being raised to clear the wagon;

Figure 15 is a similar view illustrating the double function of the jack, now pressing the breech downward to operative relation to the false cradle taken on the line 15—15 of Fig. 11;

Figure 16 is an enlarged side view of the jack and trunnion bracket on the upper part of the top carriage;

Figure 17 is a top view of the last named bracket;

Figure 18 is a detail of the push-pull jack for the saddle;

Figure 19 is a detail front view of the false cradle;

Figure 20 is a detail longitudinal section of the coupling of the front axle truck and carriage wagon frame;

Figure 20-a is a front end view of the front axle truck;

Figure 21 is a detail fragmentary section on the line 21—21 of Fig. 20;

Figure 21-a is a fragmentary top view of the plate 160' showing the keyhole;

Figure 22 is an elevation of the carriage wagon frame jack;

Figure 23 is a fragmentary horizontal section of the wagon jack travel anchorage;

Figure 24 is a fragmentary perspective of the trail travel lock;

Figure 25 is a detail plan of the false cradle or receiver;

Figure 26 is a detail perspective of the ammunition loading tray;

Figure 27 is a top view of the carriage wagon unloaded;

Figure 28 is a top view of the triple roller for supporting the tube;

Figure 29 is a rear view of the false cradle;

Figure 30 is a side elevation partly in section of the equilibrator and cradle;

Figure 31 is a left side view of the carriage showing the tube roller mounting, traverse mechanism and equilibrator reservoir;

Figure 32 is a fragmentary elevation of the rear part of the cradle showing in section the lug 141 of the cradle and lug 136 of the false cradle;

Figures 33 and 34 are top and side views of the maneuver bar, while Figs. 35, 36 and 37 are sections respectively on the lines 35—35, and 36—36 of Fig. 34, and medially of Fig. 33 showing only the bolt 304 and its mounting;

Figure 38 is a plan of the template;

Figure 39 is a plan of the carriage wagon rear draw bar;

Figure 40 is a fragmentary cross section at one of the sills of the cannon wagon;

Figure 41 is a cross section showing the relationship of the carriage wagon frame and the guide bars of the bottom carriage.

In providing for the transportation of a heavy caliber piece such as an 8-inch gun or the 240 mm. howitzer we have formed the complete bottom and top carriage, and the elevating and traverse mechanism as one load termed the carriage unit; and the tube, cradle, and recoil and firing mechanism, together with the breech and firing mechanism, as another load, termed the cannon unit.

For these two loads or units respective specifically adapted wagons are provided, of novel construction coordinated with the respective loads in a novel way and having peculiar advantages in conjunction with the several and joint functional relations of the two loads, and functioning interdependently with the two loads.

The mount comprises a bottom carriage to be anchored to the earth, and a top carriage rotatable thereon on a vertical axis, the top carriage having a false cradle or receiver pivoted by horizontal trunnions on the top carriage, constructed to receive by quick coupling a separable tube unit including a conventional cradle and recoil mechanism. The top carriage carries a traverse gearing engaged with the bottom carriage and also carries an equilibrator and an elevating mechanism, both connected with the false cradle as will be described. Conventional sights and other fire controls and computing devices may be used or adapted to use with the weapon in accord with approved practices. The specific features of fire control, recoil and equilibrator mechanism, breech and firing mechanism, elevating mechanism and traverse mechanism as well as framing details in carriage and cradle, will not be claimed herein, and therefore will not be specially disclosed or described except as specifically modified to accord with the invention and objects first stated or otherwise involved to present a full disclosure of the use of the present invention.

*The bottom carriage*

The carriage unit is of the split trail type as superficially viewed, though departing in many ways from conventional trail type carriages. The bottom carriage includes a built-up welded rigid foundation unit or base 50 (Fig. 31) specially designed for this service so as to afford a planiform bottom plate 51 of large area adapted to slide into place in loading and unloading, and adapted to be set upon a hard surface or bed such as hard earth, trap rock or a plank mat 52 as shown (Fig. 1), or set on a quick setting cemented aggregate of gravel and sand. The forward portion of the under surface of this plate is bevelled or curved upward at 53 to facilitate its sliding movement from or to the transport wagon, and to a final firing support when set in firing position by the winch method. A turret antifriction bearing, raceway and housing ring 54 of conventional construction surmounts the base 50, to support a top carriage 55 for traverse thereon, the details of which are not shown. At each side of the base 50 lateral weldment extensions 56 (Fig. 2), V-shaped in plan, are built thereonto, including a heavy vertical trail-hinge knuckle 57 exceeding in height the base part 50 for a novel purpose, as will appear. Fitted over and under this knuckle at each side of the mount there are upper and lower projecting ear pieces 58—58' fixed at the top and bottom sides of respective trails 60 (Figs. 1, 2, 3), serving the usual purposes, and in addition several novel ones as will appear. The ears 58—58' are apertured in alinement with the knuckle and receive commonly with the latter a hinge pin 59 which is preferably fixed in the ears to move therewith.

The trail 60 (Figs. 1–3) is of a length appropriate to the height of the point of application of recoil to the carriage and to the size of the tube bore and ammunition, but the height of the trail at its hinge exceeds what might be sufficient for the simple buttressing effect required, this being introduced in order to attain functions novel in this arm, as will appear. Thus, while in the instant mount the height of the base 50 approximates eighteen inches, the height of the trail from bottom to top at a transverse line across the rear part of the base 50 exceeds thirty inches. The top of each trail includes a broad planiform compression member 61 which slopes downward from adjacent the hinge to the end of the trail proper, which at its extremity has a height of in the neighborhood of ten inches, with the top plate 61 stopping short of the free end, the latter including projecting end portions of an outer side plate 62 and the thickened corresponding end 63 of an inner side plate 64 (Fig. 24). The underside of the trail is closed by a bottom planiform plate 65, so that the trail constitutes a simple closed boxing in cross section. Each trail is united securely with the ears 58, so as to form an adequate hinge between the base 50 and the inner end of the trail. The outer end of the trail is closed by a vertical end wall plate 66 at the outer end of the top plate 61. Accumulation of dirt in the trail is thus minimized.

The trails are pivoted so that they may be swung together at their extremities (Fig. 24), and the thickened inner side plate ends 63 are inclined so as to lie flat together over some distance, the left trail carrying a tapered pilot pin 67 on the plate 63, while the right trail plate 63 is apertured to receive the pin tightly when the plate ends 63 abut each other. The pin 67 extends into the space within the open end of the right trail and has a diametrical slot therethrough, through which there is engaged a wedge cross pin 68 by which the trail ends are locked together in travel.

Transversely through the bottom of each trail immediately beside the rear face of the wall 66 there is formed a slot 69 (Figs. 1 and 9), and for positioning under each trail there is a respective float 70 (Figs. 2 and 4), having a bridge rib 71 thereon adapted to set snugly in the slot 69 to support the trail end, the float being otherwise a substantially rectangular foot plate having handles 72 (Fig. 4) at the sides in sufficient number to enable ready manual portage. A low cross plate 73 (Fig. 24) is welded into the open end of the trail immediately beside the rear side of the slot 69, and through this plate and the bridge rib 71 apertures 74 are formed to receive commonly a wedge key 75 (Fig. 2) which may be driven in. An end bottom plate 76 is welded to the side plates 62, 64, of the trail, curved upward toward the rear and on this account slotted at 77 to avoid interference with placement or removal of the key 75. For winch or tractor swinging of the trail, a horizontal towing eye plate 78 is set through the projecting ends of the side plates 62 and 64 over the slot 69 in each trail, this eye plate being extended and apertured to receive a tackle hook or other means.

A swivelled tie bolt and hand nut at 79 are mounted at the outer side of and near the extremity of each trail (Figs. 23, 24) and a similar bolt is mounted at the inner side of the trail spaced longitudinally from the first the length of the float. The float is of a width equal to that of the two connected ends of the trails, and the latter diverge at such angle that the inner swivelled bolts may engage through lugs at the ends of the floats (Fig. 4) while the first bolts at 79 may be likewise engaged with the opposite ends of the floats one float being placed over the other so that by screwing down on the nuts the two floats are clamped to the trails for travel.

Along the outer upper side only of each trail there are permanently fixed longitudinally spaced stake sockets 80 adapted to receive stake pins 80' (Fig. 3) welded to the outer sides of side rails 81 which are thin, planiform, elongated plates, and may be set on edge at the outer sides of the trails to guide wheels of trucks moving along the trails as will be explained.

At the top hinge ears 58 of the trails, stop arm extensions (Figs. 5-8) 83 are formed on the trails extended inwardly toward the base 50 and downward over stop blocks 84 (Fig. 2) mounted on the extensions 56, a raised stop 85, being formed on each block, to engage the arms 83 when the trails are at closed or travelling position, and another stop 85 is formed on each block to engage the arms 83 when the trails are at maximum spread or firing positions.

The lower hinge ears 58' are substantially the same as the upper ears 58 without the stop arms 83 (Figs. 1, 4) and it may be noted that they are below the level of the bottom plate 51, which is permissible on account of the mat arrangement (Fig. 1) for supporting the plate 51 in emplacing the piece and also by the arrangement of the wagon structure in relation to the bottom carriage as a load unit. When the base carriage is set directly on the ground, the ground surface may be excavated under the pivots.

On the inner and outer sides of each trail near the lower edge, spade anchor jacks 86 are provided (Figs. 1-2), there being four. Each jack consists of an interiorly threaded forward tube and a rearwardly extended screw therein each having a ball 87 on its outer end; one ball being set and retained in a heavy forward socket 88 on the trail, while for transport the screw or ball shank of the jack at the inner side of the trail is rested in a lateral hook-like rearwardly located bracket 89 near the ball head of the screw when the screw is partly retracted from spade-engaging position. In travelling, the ball on this screw when partly extended engages part of a wagon-to-trail travel support bracket or saddle 200 pivoted on the wagon, and so serving as a coupling and support for the trail, as will be described. On the outer side of each trail there is provided another bracket rest 89 but serving solely as a travel rest for the jack screw, and rearwardly of this bracket on the trail there is an eye plate 89' (Fig. 1) at right angles to the axis of the jack, with a large aperture in which the screw ball may be set to hold the jack in travelling position on the bracket 89.

Anchor spades 90 are provided (Fig. 2), two for each trail, to be positioned in the earth below and at respective sides of the trails adjacent brackets 89. The sockets 88 and brackets 89 are each alined with the corresponding ones on the opposite side of the respective trail, so that when the anchor spades are positioned side by side in the earth below the trails the jacks may be readily dropped to engaging relation therewith to transmit thrust of recoil from the trails to the spades, and each jack extended nearly alike to apply thrust to a respective spade (Figs. 1 and 2).

Each spade consists of a rectangular rigid foundation plate 91 stiffened by high bounding flanges on one side, and on the same side there is welded a hollow cone 92, with its axis diagonal to the plane of the plate 91, so that when set with the plates in the desired positions side by side in the earth, one on each side of the trail, the axis of the cone will extend upward and forward toward the respective socket 88. Ball sockets 93 are fixed at the apices of the cones adapted to receive respective screw balls, by lowering and extending the jacks. To prevent slippage or displacement of the spades transversely or downwardly respective U-shaped clevises or hangers 94 are pivoted to the upper edges of the plates 91, one arm of each clevis at each side of the plate, so that the bight of the clevis may swing transversely of the trail. On each side of each trail rearward of the eye plate 89' and rearward of the travel position of the jack bracket 89, a hook stud 95 is fixed on the trail over which the respective clevis may be swung before the jacks are applied to the spades.

To hold the trails securely spread under firing stresses and to assure maintainance of proper angular spread thereof for firing, a combined tie and stay 96 (Figs. 2, 3) is provided, in the form of a beam separably articulated midlength and connected pivotally at its extremities to respective trails a distance rearwardly of the spades 90. The connection at the articulation is such as to impart rigidity to the beam when joined. The middle joint in this beam is formed by triangular plates 97 secured to the top and bottom of respective sections of the beam and offset so as to lap those of opposite sections at points spaced a substantial distance transversely of the beam and having apertures in the lapped parts at those points, a pin 98 being inserted through each two alined apertures of the lapped parts so as to hold the parts of the extended beam rigid. The beam is mounted at such level on the trails and with the pivots of the beam sections on the trails so arranged, that when the midjoint is disconnected by withdrawal of the pins 98 the two pieces may be swung forward to lie beside the trails above the jacks 86. Two support brackets 99 are fixed in vertically spaced pairs on each trail with alined apertures to register with corresponding ones in the plates 97 when the beam sections are swung forward and outward to the trails, where they may be secured by the pins 98. When only the forward pin 98 is removed from the lapped plates 97 and the rear pin 98 left engaged therethrough the latter serves as a pivotal connection while the trails are swung outward or inward between their parallel and extended positions.

A rail 100 (Fig. 2) for supporting slidingly the outer end of an ammunition loading ramp 105 (Figs. 2 and 26) is mounted between the trails and this is also articulated to enable it to be included with and over the beam sections for travel. For this purpose, respective main rail sections 100 are fixed on respective sections of the tie beam 96 at the top sides of the sections and so arranged in relation thereto that when the latter are moved into full spread relation as in Fig. 2, the inner ends of the rail sections abut centrally and a virtually continuous rail concentric with the axis of traverse of the weapon is formed extending over an arc of somewhat less than the full angle of traverse movement of the piece. To accommodate the full radius of traverse, short rail sections 101 are pivoted at the extremities of the main sections of rail 100, on small brackets 102 fixed on the respective sections of the beam 96 and are supported at their swinging extremities by links 103 pivoted thereto, longitudinally slotted and secured on top of the respective beam sections by wing nuts and bolts or the like as at 104, Fig. 2. When the trails are fully spread and the beam 96 in place, the slotted links 103 are pressed forward to support the short rail sections 101 in alinement with the main rail portions 100 and are secured by the wing nuts. When the trails are to be closed to track or travelling position the wing nut is loosened and as the beam sections are swung out beside the trails, the extremities of the sections 101 engage against the sides of the trails and are pressed away and out of line with the rail parts 100 as seen in Fig. 3. The rail 100—101 is utilized to support a downward extension or leg on the outer end of a trough-like tray or ramp 105 (Fig. 26) the forward end of which may be set in the open breech of the gun while a projectile or propelling charge is set on the tray and pushed into the chamber of the piece. The rail permits alinement of the tray with the bore of the weapon at all positions in azimuth to which the tube may be swung on this mount.

To secure the trails in parallel or ramp track position (Fig. 3), a spacer bar 106 is provided of such length and so apertured at the extremities that it may be connected between the opposed sets of brackets 99 when the trails are parallel. At the same time, the beam parts 97, being disconnected from the brackets 99, may be connected centrally to the spacer bar 106 as in Fig. 3. The parts 97 may have their rearward apertures in registry at this position and may have a pin inserted therethrough additionally.

At the bottom and front of the base 50 (Figs. 2-3) a central draw bar or eye 107 is rigidly mounted to receive a winch line hook, or the like, for pulling the carriage unit on to the wagon, and at each side respective guides 108 are formed over the bottom plate 51, each guide and the plate 51 being slotted in registry to receive a vertically slidable thick guide bar 109 having a stop lug at its upper end to limit its downward movement, the bar having upper and lowering openings therethrough and the guide having a single aperture so located that when the bar is lifted to inoperative position a pin may be inserted through the guide and bar to hold it so. At its lower position (Fig. 31) the bar projects below the bottom plate 51 a substantial distance and the upper aperture in the bar registers with the opening through the guide, so that the pin inserted through guide and bar there will prevent the latter from being accidentally forced upward to inoperative position. The two guide bars 109 thus mounted are transversely spaced so that they may engage on respective sides of a carriage wagon frame to be described and hold the carriage on the frame during sliding movement of the carriage thereon in loading and unloading by winch. Near the rear of the carriage base 50 tie down bolts 110 (Fig. 4) are pivoted on the wagon adapted to be swung upward and into forked lugs 110' (Figs. 1-2) on the base 50 near the knuckles.

The top carriage

The top carriage 55 (Figs. 1, 28) is a built up weldment, U-shaped in plan, its open side being toward the rear, mounted conventionally on the base 50, and the mount customarily includes a roller bearing before mentioned, and center pintle to hold the top carriage in place and take horizontal thrust, these being features comprising no novel part of the present invention and therefore not shown.

A traverse mechanism 111 (Figs. 28-31) is mounted in front of and at the left hand part of the top carriage and includes a pinion 111' extended downward meshed with a spur sector 112 fixed on outwardly extended brackets 112' on the base part 50. An operating shaft 113 (Fig. 31) is extended rearwardly from the mechanism 111 beside the left member of the top carriage and has a hand wheel and crank thereon at 114. The top carriage side members 115 are extended rearwardly beyond the base 50 and upwardly, to afford supports for main trunnion bearings 116 (Figs. 1, 31, 16, 17) at their upper sides. In these bearings there are engaged the trunnions 117 carried on respective side members of a false cradle or receiver 118 (Figs. 19, 25, 29, 30, 11, 31), which is permanently so mounted. This false cradle is a deep heavy weldment (although it may be cast in part or as a whole), substantially V-shaped in cross section open at each end and the top, with its vertex flattened. The trunnions 117 are fixed permanently on respective upper vertical side walls 119 of the false cradle and near its rear end.

A heavy spur-toothed elevating sector or arc 120 (Figs. 30, 31) is formed with a bracketing 121 bolted to the flat underside of the bottom of the false cradle, and this is utilized in conjunction with an elevating gearing 122 (Figs. 1, 4, 28, 30, 31) on the right hand member of the top carriage, operated by a large hand wheel 123 at the right hand side of the top carriage. An equilibrator system 124—125 (Figs. 29, 30) of approved construction is provided for counterbalancing predominant weight of the barrel forwardly of the trunnions, this equilibrator comprising two oil filled cylinders having their closed ends pivoted at respective sides of the false cradle at its lower rear part and each having a piston rod extended forwardly therefrom and pivoted to a bracket on the top carriage. A gas pressure reservoir 125 is mounted on the front of the top carriage maintaining pressure in the cylinders tending to propel the cylinders forward and so elevate the forward end of the false cradle.

This false cradle receives removably the true cradle of a barrel as will be later described, and when the barrel is not so mounted the force applied by the equilibrator tending to elevate the false cradle is opposed by means of respective sets of turnbuckle links or "road locks" 126 at each side of the mount (Figs. 10, 11, 19, 31), in order to prevent the false cradle from being elevated to an extreme position, which would make subsequent placement of the barrel and its cradle difficult, as well as to relieve the elevating gear of undesirable stress and shocks in travel. This lock comprises a usual right and left thread sleeve or turnbuckle link engaged on respective eye bolts connected respectively to false cradle and carriage. The upper bolt is pivoted between two lower ears of a clevis 127 the upper two ears of which receive therebetween and are pivoted to, a heavy lug 128 extended forwardly from the upper front end of the respective side of the false cradle. The lower eye bolt of each road lock turnbuckle has its eye set around a heavy hook 129 having an elongated downwardly extended shank pivoted at its lower end on the inner side of the adjacent side member 115 of the top carriage for travelling, before removal of barrel and cradle and while they are removed. The turnbuckle sleeve permits extension and retraction of the lock to vary the inclination of the false cradle when necessary. When the barrel is mounted, the lower bolt of 126 has its eye set around a necked pin 129a in the lower front end of the false cradle (Fig. 19) so as to prevent misplacement of the lock or interference with operation or service of the piece. The shank of the hook has an arm 129' extended inward from its pivot, which, when the travel lock is engaged, is caused to rise so as to engage under and support the cylinder 124 of the equilibrator. The top carriage has conveniently located seats 131 (Figs. 1, 4, 9) for trackers or other crewman and platforms 132 two front and two rear swingable to position outboard or inboard for use or to clear the space behind or beside the mount piece.

The false cradle side walls 119 (Figs. 29, 31) are formed with broad top surfaces in a common plane and have inner thickened parts at their forward ends constituting rectangular lugs or flats 133 extending from top and ends of the walls downwardly and rearwardly on the inner faces of the walls, being smoothly finished to receive slidingly therebetween corresponding finished flat faces 145 (Fig. 9) on the true cradle, to be described. At their rear ends the walls 119 are similarly thickened, and formed with key recesses or slots 134 open through the top faces of the cradle and also through the inner side faces of the respective walls. Each of these recesses has a rear planiform side normal to the top surface of the wall and a forward planiform side upwardly divergent from the rear side, so that the recess is wedge shaped as viewed from within the cradle (see Figure 30). The recess 134 is of uniform depth as measured from the plane of the inner face of the wall 119 horizontally outward throughout its vertical and fore-and-aft extent.

A threaded hole 133' (Figs. 11, 25) is formed in the top of each wall 119 close to its forward end, to receive a cap screw 135 (Fig. 1) by which the true cradle is held in place on the false cradle as will appear. The false cradle also has a rearwardly projecting heavy lug 136 at the top of each wall, flush with the top face of the latter and bored to receive a taper stud bolt 143 fastening the true cradle to the false cradle as will appear.

There are provided respective wheel ramp attachments 130 (Figs. 3, 9) for the trail ends, which are adapted to be set against the extremities of the trails, extending longitudinally therefrom, each having a top surface plate of the same width as the trail top, adapted to be set over the open end of the latter and sloping from the top plate of the trail to ground level, where a broad base flange is provided projecting at the rear and slotted or apertured at 278 to receive a fastening.

*The cannon unit*

The cannon unit (Figs. 9, 10) includes the barrel 138 which may be of conventional manufacture, carrying a breech ring and mechanism, none of which comprise novel features of the present invention and therefore are not shown or described in detail.

A cylindrical cradle proper 137 is included in this unit, this being a sleeve in which the barrel is conventionally mounted; and a recoil and recuperator mechanism 138' is formally shown mounted in saddle brackets on the cradle and connected with the barrel to function in the usual manner.

The cradle is provided with a forward circumscribing collar 139 forming part of the mounting for the recuperator and counter-recoil cylinder under and over the cradle the rear portions of the latter two being supported on brackets at the rear of the cradle. A saddle piece 140 is secured around the lower part of the cradle in its rear half and is provided at each side with a lateral vertically bored heavy lug 141 adapted to extend over and rest on the top face of the side wall of the false cradle over the rear lug 136, and a downwardly tapered key 142 is also formed on each side of the cradle saddle by a thickening of the material of the saddle. The key is arranged to enter the respective key recess 134 from above and to fit snugly the forward and rearward faces of the recess when the lug 141 engages the top of the false cradle lug 136. The bores of lugs 141 and 136 aline to receive the tapered stud bolt 143 therethrough (Fig. 32). The collar 139 is also formed with a forward heavy lateral support lug 144 apertured to aline with the respective opening 133' in the adjacent wall of the false cradle so that the cap screw 135 (Fig. 1) may be engaged through the lug 144 and in the hole 133' to hold down the forward part of the cradle on the false cradle. The tapered stud bolt 143 is threaded and fitted with nuts at top and bottom the lower end being of reduced diameter and the bolt being tapered in an intermediate part of its length so that by drawing it downward it may be caused to fit the holes in the lug and cam the cradle relative to the false cradle so as to aline the bores and cause a snug fit of the keys 142 in the key slots 134, both longitudinally of the cradle and laterally thereof, and so that good alinement of the cannon with the mount may be assured. The collar 139 is formed with flats 145 at each side finished so as to fit between the inner opposed faces of the lugs 133, to facilitate and complete the longitudinal alinement of the barrel and cradle with the false cradle and carriage when the two main units are set together. In addition, foot brackets 141' and 144' (Fig. 9) are provided below the lugs 141 and 144 to engage on steps 133a and 136a on the lower sloping sides of the false cradle (Fig. 29).

It will be apparent from the foregoing that the elevation and traverse mechanism and the equilibrator all coact to afford support, adjustment, and movement of the cannon on the carriage, but are connected with structure below and including the false cradle, so that the barrel and cradle may be either in place and operative, or may be lifted from place, without disturbing the functional connections (the travel lock for the equilibrator being an added safety feature separate from the operative connections).

It will also be seen that the recoil and counter recoil devices are contained complete and always ready for functioning in the cannon unit, and fully coactive between the barrel and cradle, so that these connections are undisturbed in removal or emplacement.

Adjuncts of operation of the piece, such as sights, telescopic or otherwise, quadrants, range finders, remote control pointing devices, fuze setters, elevation brake, etc., may be mounted as found expedient on the cannon unit, or carriage unit.

Respective wagons are provided for the two travelling units, particularly adapted to the weight and form of the two loads represented, on the one hand by the bottom and top carriages and the trails; and on the other hand by the true cradle, barrel and recoil assembly. The structure previously described adapts the weapon to be dismounted by the use of a crane hoist, if available, by removing the two cap screws 135 and the two tapered stud bolts 143; connecting hoist tackle to lifting eyes 146 (Figs. 1, 11) formed on or permanently attached to the collar 139, and lifting lugs 147 permanently secured to the sides of the forward end of the cradle, then hoisting the cannon unit and swinging it into place on its wagon; after which the carriage unit may be hoisted to its wagon, the hoisting slings being connected to the apertured extremities of the lugs 128 and to lugs 148 (Figs. 2-3) welded to the inner sides of the trails adjacent the support brackets 99 for the spacer bar 106. Removal from the wagons and emplacement by crane hoist is the reverse and may be accomplished within about two hours, including excavation of the necessary pits, which may be done before placement of the carriage.

However, it is essential for full utilization of this weapon that provision be made for its emplacement and/or reloading on the wagons without dependence on use of power or other common hoists, and for that reason, the wagon structures and the weapon units have been constructed and organized in a novel relation, to enable the unloading of the units from the wagons to firing positions by the use of a winch, as a simple horizontal draft operation, and to enable the similar reloading of the two units as such on the wagons. For this purpose, the trails have peculiar proportions before referred to in relation to the mount and the cannon wagon, and also in the connections of the cannon with the carriage and otherwise. The trails are peculiarly located in relation to the body parts of the carriage as compared to prior practice, and these and other features of both carriage, cannon and wagons are peculiarly coordinated to contribute to the indicated use of the apparatus for emplacement and for dismounting and travel.

For use in loading and unloading of the cannon unit, two skid legs 149 (Figs. 4, 9, 10) are secured permanently to respective sides of the cradle near its rear end, adapted to rest on side sills of a cannon wagon frame and to slide thereon as the unit slides along on the frame. Each leg is formed with a rearwardly projected foot lug 149' adapted to engage under a matching claw 230 (to be described) on the wagon at the rear limit of position of the cannon unit thereon. A depending inset guide 149'' is also provided beside the leg 149 to set slidably within and beside the sill of the wagon frame. The foot lug is bored from the rear and threaded to receive a heavy anchor bolt of the wagon all of which will be described hereinafter. Forwardly of the legs 149 (Fig. 14) respective jack base brackets 150 are welded to the cradle each having a lower removable arm 150' of a form coordinated with a special saddle and manual jack to be described, to enable raising and lowering of the cannon unit breech end pivotally on the false cradle in final placement on the mount for application of fastenings. There are also permanently provided on the cradle upper rear and lower forward draft hooks or eyes at 151, by which the cannon unit is pulled from carriage to wagon and vice versa, and by which hold back lines may be attached to oppose excessive movement of the tube unit by the winch.

The carriage wagon

For the carriage unit a wagon 45 (Figs. 4-8, 20 and 27) is provided, comprising a frame of two principal side members or sills 152 of box section, smooth and uninterrupted on their tops and at the upper outer sides, rectilinear throughout the intermediate major part of their length, the frame sloping downward on its upper surfaces toward its front end, and also toward the rear for a distance stopping short of the rear end, as will be further referred to. The frame is conventionally provided with cross members and reinforcements assembled and welded to afford a way on which the carriage bottom plate 51 may slide from the ground on to the front end of the frame and throughout the length of the frame to near the rear end thereof. It is important to note that the outer upper sides of the side members 152 are smooth, and rectilinear from near their front ends to near their rear extremities and are spaced to fit between the guide bars 109 (Fig. 31), carried by guide 108 on bottom plate 51. At their forward parts they are connected to two parallel spaced, inner longitudinal box girders 152' laterally inward of and horizontally alined with the sills 152, extending to the forward extremity of the frame, from a distance rearwardly within the frame. The under sides and top sides of the girders 152' (Fig. 27) are sloped upwardly and downwardly respectively toward the ends so that the extremity of the frame is of small vertical dimension, to give the frame a good bearing on a ground surface and enable ready sliding of the base carriage from near or at ground level on to the end of the frame in the winch loading to be described. The ends of the girders 152' define a forward curved end and width of the frame, a curved front plate 153 being welded to these ends and beyond on each side. Diagonal side portions 154 (Figs. 4-8, and 20-27) extend from the ends of the side members 152 horizontally convergent forwardly to the ends of the plate 153 and these side portions are of somewhat lower height than the intervening portions of the girders 152'. Top plates 155 (Fig. 27) are extended integrally from the upper edges of the side portions 154, sloping upwardly to the upper surfaces of the girders 152' and welded thereto. These plates 155 are shaped at their rear parts to terminate flush with the top ends of the side members 152, to which they are also united, so that smooth continuous sloping surfaces are provided from the front end and adjacent sides of the frame to its uppermost top level. Across the under sloping sides of the girders 152 and side portions 154 an inclined planiform lower junction floor plate 156 is welded, fitted and joined to all, and to the plate 153, the middle portion of which has a planiform integral rearward reinforcing extension welded over the plate 156.

A detachable front truck 160 is provided (Figs. 20, 21) comprising a front cross plate 157 conforming to the plate 153, and side plates 158 joined thereto (these parts located below the floor 156), and having a heavy cross member 159 spaced forwardly of the rear termination of the floor 156. A top plate 169' is welded to the plates 157 and 158 and cross member 159, and a bottom plate 161 is similarly secured to the bottom edges of the same parts. Additional cross stiffening may be included as shown. It should be noted that plate 169' lies below the top edge of the plate 157, so that the latter will function against plate 153 as a stop to rearward movement of the track 160 in coupling the latter to the wagon frame, as will appear. The side plates 158 are joined by a heavy cross block 158' at their rear extremities. In the plate 157 a heavy horizontal sleeve fitting 162 is fixed, extended rearwardly to the cross member 159, to which it is secured. A bushing 163 is fixed in the forward end of the sleeve, in which there is revoluble and slidable a horizontal stud shaft 164 having a knuckle 165 at its forward extremity engaged between upper and lower pivot bearings of a U-section front axle 166, carrying wheels 169 (Fig. 27) conventionally mounted at each end. A king pin 170 (Figs. 1, 4, 27) is engaged through the axle and knuckle. The rear end of the shaft 164 is reduced and mounted revolubly and slidably in a bearing 171 formed at the rear end of the sleeve 162, a bushing 172 being engaged around the shaft slidably with the latter in the bearing 171 and having a flange at its forward end engaging a helical compression spring 173 encircling the stud shaft. The bushing 172 and shaft 164 project rearwardly of the bushing 172 and a nut and washer 174 on the shaft transmit to the bushing and spring the draft forces applied to the stud shaft through the axle as will be understood.

On the front side of the axle near each wheel there are respective pairs of ears 175 between which are pivoted ends of respective side members of a triangular draw bar 176 having a lunette at its apex (Fig. 27) by which the wagon may be coupled conventionally to a prime mover.

The rear part of the front truck has set rigidly in its upper part a heavy pilot bar or tongue 177 (Fig. 20) projecting rearwardly and its extremity pointed. A structural cross web 178 is set between the girders 152' of the wagon frame just back of the bar 158', its lower part reinforced and extended below the wagon frame and apertured to receive the bar 177 therethrough. The truck 160 is also provided with short lug ears 179 (forming parts of porter bars 192 to be described) projecting rearwardly below and laterally of the tongue 177 and chamfered to engage under and against the lower edge of the web plate 178 to hold the tongue and truck against loose movement and to resist torque around the pilot tongue. The end plate 158' may extend upward to engage between the girders 152' for longitudinal sliding movement and to add to the lateral stability of the truck mounting by preventing lateral play.

With the truck 160 in place, the cross block 158' is immediately in front of the cross web 178 and the front plate 157 of the truck immediately in front of the front plate 153 of the main wagon frame; and the plates 156 and 169' are in flat face-to-face abutment. The bar 177 is also projected through the web 178 beyond the tapered part of the tongue. When the parts are so engaged, apertures 180 in the extreme forward reinforced parts of the plates 156 and 169' are alined and have a heavy flanged coupling pin 181 set therethrough. Rearwardly of this pin a short distance (Fig. 21a) alined keyholes 182, each with two diametrically opposite radial key slots are formed respectively in the reinforced parts of the plates 156 and 169', and on top of the plate 156 a collar 183 is set, bored in alinement with the circular parts of the key holes. Set upwardly through the key holes and collar 183 there is the cylindrical shank of a key 184 having lateral arms normally set at right angles to the key hole slots below the plate 169' but adapted to be turned to bring the arms into alinement with the slots, through which they may be drawn upward as far as the collar 183. The upper extremity of the key shank is provided with a transverse pivot pin 185 (Figs. 20, 21, 27) and this is set eccentrically in parallel cam lobes 186 beside the shank, formed on the end of a lock lever 187 and resting on top of the collar 183. A longitudinally slotted bracket arm 188, pivoted on the plate 156 behind the key for fore and aft movement, receives the handle end of the lever therethrough for vertical oscillation in the bracket, and is formed with a series of longitudinally spaced transverse holes adapted to aline successively with a hole through the lever as the latter is moved to locked or unlocked positions and a chained pin 189 is provided for insertion through the arm 188 and lever to hold the latter at locked position. When the lever is in position as in Fig. 20 and is pressed down, the key is cammed upward, clamping the plates 156 and 169' together, and may be so fastened by the pin 189. To release, the pin 189 is removed, the lever raised above the sloping top 155 and rotated around the axis of the key shank through ninety degrees and then lowered to draw the key arms into the key hole slots.

The cross block 158' (Fig. 20a) is formed with a pair of vertically spaced arms 190 at each side, and between each pair there is revoluble a vertical shaft 191 midway of which the furcated end of a porter bar 192 receives the shaft 191 and is pivoted to the shaft for vertical oscillation. Spaced inward on the lower arms 190 of the block from the shafts 191 there are knobs 193, and over these a space is formed below the upper arms 190. The furcations of the bars 192 project beyond the shafts 191 providing at their extremities the lug ears 179 before mentioned so that when the bars extend outward horizontally at right angles to the wagon body, the ears 179 fit on each side of the knobs 193 and set therebelow against the tops of pins 193' set through the knobs. Thus the bars may be used as lifting handles and become locked against either horizontal movement or further elevation at their outer ends. By lowering the free outer ends of the porter bars the furcations may be cleared from the knobs 193 and the bars swung forwardly beside the truck 160 as in Fig. 4. When the bars are raised beside the plates 158 the furcations at the inner sides lie against the knobs 193 in such manner that the bars are prevented from swinging horizontally outward against and also press upward against the web 178 as in Fig. 20. Small travel saddle brackets 194 are welded to the sides of the truck, and the outer ends of the bars 192 may be sprung into engagement with the brackets and so be held releasably against dislodgement (Fig. 20a). Fastenings may be employed to hold the bars retracted if desired. The rear of the wagon frame is mounted on a bogie truck 195 of conventional tandem axle, torque rod and load equalizer arrangements, the details of which are not parts of this invention and therefore are not illustrated. Each of the tandem axles, as the axle 166' has single tired wheels 169 at each end. The wheels of all the axles have the same track gauge spacing, which may conform to a standard gauge for road vehicles of a country in which the armament is to be used, and it is important in this respect that the spacing of the hinges of the trails 60 should also conform to this gauge, or, if different, that the major parts of the trails be so constructed that when in parallel ramp relation they will have a corresponding spacing, for reasons which will appear.

The wagon frame and load are unsprung, but pneumatic tires 196 of large diameter are used on all the wheels, affording sufficient absorption of road shocks to avoid objectionable disturbance of the load carried.

Near the rear end of the frame, at the rear end of the rear slope 196' thereof, bumpers 197 are provided (Figs. 4, 27), comprising forward low parts against which the guides 108 for the guide bars 109 may abut when the carriage is drawn to fully loaded position on the wagon. These bumpers are extended upwardly and rearwardly to support a cross rail 198 which is spaced rearwardly of the air or gas reservoir 125 of the loaded carriage as a guard for the latter and other parts of loaded carriage and particularly as a stop and support for the anchor spades 90 when loaded on the extreme rear of the wagon, as will appear.

The wagon frame extends at the rear beyond the bumpers and guard rail 198 and has two elevated side rests or shelves 199 upon which the spades 90 may be set and bolted, as well as secured to the cross rail 198.

On each side of the carriage wagon frame at the forward end portion (Figs. 4, 27), but rearwardly of the tapered end part of the frame, there are welded to the side members 152 two brackets 200' spaced longitudinally of the frame, each having two projecting lugs between which short longitudinal rods are fixed, parallel to the sides of the frame. Pivoted on these brackets, at each side there is a spade jack saddle 200, of right triangular form. The base member of each has two hooks 201 arranged and constructed to receive the rods of the brackets when the jack saddle is laid horizontally outward from the frame and lowered translatively with the bills of the hooks close to the side of the wagon frame. The saddle is removable by a reverse movement in the position indicated. The hooks are so formed that when the saddle is raised to vertical position the inner or intermediate parts of the bights of the hooks will lie between the wagon frame and the rods in the brackets. The upper parts of the bights extend across the rods of the brackets 200' at such level as to clear the rods, as will appear. When so erected, each saddle has an upright principal rear leg over or adjacent the front bracket, and a diagonal side connecting the upright and base member of the saddle over the rear bracket 200'. A ball socket 202 (Fig. 4) is rigidly mounted on the upright above the junction with the diagonal, the open side of the socket being presented rearwardly of the wagon (but forwardly of the loaded carriage) and arranged to lie just above and forward of the bracket 89 of the trail of the loaded carriage. The saddle is also formed with a rearward shoulder 203 arranged so as to pass under the bracket 89 when the trail 60 is at such level as to bring the jack 86 into line with the socket 202, while the jack ball shank is rested in the hooklike bracket 89.

The vertical member or leg of the saddle device is formed with an inwardly set heel part 204 at its lower part adapted to rest upon the top face of the side member 152 of the frame when the saddle is erected and, at the upper part of the vertical leg of the saddle an outwardly extended load-engaging shoulder 205 (Figs 4, 27) is formed, arranged and adapted to engage the under side of the adjacent trail 60 as a principal rest and support therefor. The principal leg part of the saddle is suitably strengthened between the heel and shoulder to sustain the weight of the trail, and when erected, transmits its load to the side member 152 of the frame in such manner that no great stress is sustained by the brackets 200' which serve principally as a retainer to prevent outward movement of the saddle from the wagon frame. Extension of the inner spade jack so as to press its ball into the socket 202 will hold the upper part of the saddle 200 firmly in load carrying position.

Between the girders 152' near their rearward ends a special jack 206 is built in (Figs. 5-8, 22, 27). This consists of a heavy column or gin 206' engaged slidably through a sleeve 207 trunnioned on the girders so that the gin may be set erect or be turned pivotally on the sleeve trunnions to lie horizontally between the girders. A rest bracket 208 is fixed on a forward cross member 209 of the wagon frame to receive and support the top end of the gin. The support consists of two ears having a transverse two-diameter wing bolt 210 therein, the top of the gin having a longitudinally extended tongue 211 slotted on the underside to receive the small part of the bolt. A counter-sunk recess is formed in one side of the tongue 211 at the inner end of its slot, to receive the larger part of the bolt 210, and the smaller end of the bolt is threaded and screwed into one ear of the bracket by which the larger part of the bolt may be drawn into the countersink to hold the head of the jack down in travelling position on the bolt 210. Handle bars 213 are extended from each side of the top of the gin for use in raising the jack to operation position.

At, or forwardly of the trunnion of the sleeve 207 as shown (Figs. 22, 27) sheaves 214 are mounted on the girders 152', and on each side of the gin at its upper end respective sheaves 215 are mounted. Twin cables 216 are anchored to the sleeve 207, extended upwardly over respective sheaves 215 on the gin 206', thence downward behind the sheaves 214 and forwardly to a forwardly located equalizer-coupling and hook 217 to which a winch line may be connected. The foot of the gin 206' is balled so as to be stepped removably in a foot plate 218, suitably recessed, the plate being carried on the wagon separately from the jack in this instance, and set in place on the ground in proper position to receive the ball foot on the gin before the jack is erected. This jack is for us in raising, and lowering the forward end of the wagon frame with and without the load, as required in the winch method of emplacement and displacement.

In the rear reduced end portions of the side members of the frame, side legs 219 of a rear V-shaped draw bar 220 (Figs. 27, 39, 4, 8) are slidably engaged to their full length for travel, being retained by cross pins 221, but may be drawn out and held by the pins 221 insertable transversely through the side members and eyes on the legs 219. The outer end of one leg has a lunette 222 thereon and the other has a clevis to receive the base of the lunette to which it is separably pinned as at 223.

Between the rear extremities of the side members 152 (Fig. 27) a wide, flanged cylindrical roller 224 is mounted in bearings on the tops of the side members, to carry a winch cable by which the carriage may be drawn on to the wagon.

Various of the separable parts described and other adjuncts, some of which will hereinafter appear, may be accommodated as convenient in spaces between the side members of the frame which spaces may be under-floored if desired, as is the space rearward of the jack 206 where the foot plate 218 and trail support 225, may be laid.

The cannon wagon

The cannon unit is provided with a wagon 46 (Figs. 9, 10, 33, 34) somewhat similar to the carriage wagon but simpler in construction, adapted to a peculiar coordination with the carriage and a peculiar movement of the cannon unit on the wagon to and from the carriage.

The frame includes two straight parallel box sills 226 (Figs. 33, 9) conventionally assembled with necessary cross connections and conventional wheel mounting, including a two-wheel simple front axle 227 conventionally pivoted directly to the front end of the frame with a fifth wheel action, and a four wheel tandem axle bogie 228, like the one 195, and with the same track guage. None of the details of this running gear are illustrated, since they comprise no novel features of the invention and are well understood. The frame departs from conventional practice in having a forward end portion inclined downward toward its extremity but not tapered laterally or otherwise.

The sills of the cannon wagon frame are spaced so as to receive the lower ends of the skid legs 149 respectively thereon (Figure 40) with the guides 149" set closely within and beside the smooth inner faces of the sills 226. Just to the rear of the forward sloping top 229 of the frame, respective anchor lugs 230 are fixed permanently on the top sides of the sills and have upper rearwardly projected claws to engage over the low knobs 149' of the skid legs of the cradle when the cannon unit is fully loaded on the wagon. The lugs 230 are bored parallel to the sills to receive slidably an anchor cap screw 231 by which the breech end of the cannon unit is secured on the wagon.

At the tail end of the wagon, a carriage tie link 232 (Figs. 9, 10) is provided at each side, consisting of a strap apertured at its outer end to receive the bight of a U-shaped clevis 233 loosely, the eyed arms of the clevis receiving therethrough a cross bolt 234. The link is apertured in registry with the eyes of the clevis arms when swung inwardly thereon, an apertured lateral flange 235 on the side of the frame being located to enter between the arms of the clevis with the link, to receive the bolt 234 through the link, bracket and clevis arms, and hold the link in travelling position. The other end of the link is longitudinally slotted for a substantial distance and slidably engaged on a bracket 236 spaced longitudinally forward on the frame from the flange 235 to lie across the inner extremity of the slot in the link when in travelling position. A pin 237 fixed on the bracket is slidable in the link slot. The slotted end of the link extends sufficiently beyond the bracket 236 longitudinally inward beside the frame, to permit the link to be drawn rearwardly of the wagon when freed from the flange 235 until the clevis arms may receive therebetween a respective apertured coupling lug 238 on the upper carriage for engagement of the clevis bolt therethrough. After this link is thus connected to the carriage the closed outer end of the slot in the link will be at the pin 237, so that withdrawal of the wagon beyond a safe cannon loading and unloading position will be prevented. The forward extremity of the link is curved downwardly to permit the link to be inclined downwardly to the level of the lug 238, which is located lower than the end of the wagon frame.

On the rear axle of the bogie a draft hook 239 (Fig. 9) is fixed by which the wagon may be pulled up on the trails as will be described.

Other adjuncts to use in the emplacement or displacement of the weapon are involved and will be described incident to their use and operation.

When the carriage unit is in place on the carriage wagon, the tie down bolts 110 are in place, engaged in the open sides of the lugs 110', the guides 108 are against the bumpers 197, the guide bars 109 down, and the trails are elevated and supported by the spade jack saddles 200 as before indicated. In addition, diagonal turnbuckle cross braces 241 (Fig. 4) are connected between respective trails and the sills at the opposite sides of the frame adjacent the end of the frame so as to hold the trails firmly against side sway in travel. Each brace includes right and left threaded eye bolts connected by a turnbuckle sleeve, the eye of one bolt being engaged with the hook lug 95 on the inner side of the trail forwardly of the pivot of the tie beam, while the other bolt is connected by a removable clevis or hook 243 to the wagon frame adjacent the front truck locking lever 187 (Fig. 27).

By the elevation and securement of the trails in this manner the loaded unit on the wagon is made more readily maneuverable in turning and in traversing undulating surfaces with a minimum liability of interference with prime movers or striking objects adjacent its path.

In this travelling condition, the side track rails 84 for the tops of the trails are laid longitudinally on horizontal lateral bracket arms 244 (Fig. 27) beside the wagon frame and held by wing nuts 245 so that they form a shelf upon which items of equipment may be carried, the trail end ramps 130 being so carried, bottom flanges of the ramp pieces being held by the same bolts and nuts 245 which hold the trails. The space beneath the trails over the wagon frame may be used to accommodate various separable parts of the armament in travel, as will be understood, the gun-loading ramp 105, the forward spacer bar 106 and the cross braces 241 being carried there.

When the cannon unit is loaded on its wagon the skid legs 149 rest on the sills as before indicated, held by cradle locking bolts 231 engaged through the lugs 230 and screwed into the knobs 149'. No other parts of the cradle engage or are supported directly on the wagon frame, but the barrel or tube 138 rests on two tube supports 246 (Fig. 12) which are columnar weldments shaped to set across respective sills of the frame and projecting beyond the outer sides thereof, depending ears thereon being bolted pivotally to bracket flanges 247 permanently mounted on the outer sides of the sills adjacent but forwardly of the connection of the wagon frame with the bogie 195. The connection of the tube supports 246 to the brackets 247 is such that the supports may be swung outwardly to a position clear of the wagon frame when the muzzle end of the cannon is independently supported. The two tube supports are tied together at their upper parts by right and left screw eyes 248 engaged in respective ends of a turnbuckle sleeve 249 each screw pivoted on a respective support, one having a quick-detachable connection consisting of a wing bolt inserted through the support 246 and the bolt eye from front to rear, the other screw 248 being permanently pivoted on its support. The upper end of each support 246 (Fig. 12) consists of a cross plate and cushion curved to fit the tube 138 and at the outer side includes a longitudinal body web 250' apertured (Fig. 9) to permit a respective hook 251 of a cross strap 250 to be hooked in the slot. The cross strap comprises two curved metal strap members fitting the tube, pivotally hinged together centrally over the tube, and each including a threaded shank extended at a tangent downwardly toward the outer side of the adjacent support 246. Each hook also includes a rectilinear threaded shank, one threaded shank on each side having a left hand thread and the other a right hand thread, and a turnbuckle sleeve 252 is co-engaged with each two so as to draw the hook upward on the strap until the tube is bound to the supports 246. By the turnbuckle connection between the supports 246 the latter may be adjusted to snugly fit the tube, and then the buckles 252 tightened to hold the tube securely in place as adjusted.

A temporary jack saddle 253 (Figs. 9, 13, 15-18) for use when emplacing the tube is located conveniently on the wagon for travel, having a transverse wide framing 254 (Fig. 13) adapted to be engaged with respective separable shiftable screw jacks 255, shown in Figs. 13, 14, 15 and 18.

A draw bar 257 (Figs. 33-35) consisting of a V-frame has the extremities of its legs pivoted to the front axle 227, and the legs are joined by a cylinder 258 the axis of which bisects the angle of the legs. It has a bearing 259 at its rear end in which there is slidable a bushing 260 flanged within the cylinder and receiving the rearward thrust of a helical spring 261 confined at the front end by the flange of a bushing 262 set in a removable bearing collar 263 bolted to the cylinder. A lunette 264 has a shank 265 with a base of large diameter revoluble in the bushing 262, being extended with reduced diameter through the bushing 260, tenoned and threaded to receive a washer and nut at 266 against the bushing. Traction shocks are thus absorbed by the spring 261.

A maneuvering bar 268 is provided (Figs. 33 to 37) having at one extremity a cross handle 269, and at its opposite end a cross yoke 267 is fixed rigidly thereon adapted to lie across both legs of the draw bar 257 immediately behind the cylinder 258. These legs have flat lower sides, and depending hooks 267' are formed on the ends of the yoke shaped and adapted to engage under the legs when the yoke is thrust back on the draw bar until the hooks wedge thereon. A stud 267a is fixed on the under side of the bar 268 having a length and position to enter the eye of the lunette 264 as a retainer when the bar 268 is lowered on to the cylinder 258 after wedging of the yoke on the draw bar as described. The weight of the maneuver bar is sufficient to retain it in engaged position when the draw bar is supported. The draw bar 257 is arranged to be supported in a raised position (Fig. 34) while the maneuver bar is in use, and free for upward and downward swinging movement at other times. The construction includes a horizontal dash platform 302, fixed on the axle 227 and projecting forwardly, of a size to clear the draw bar when lowered. On this there are front and rear upstanding guide brackets 303, apertured to receive slidably a bar pin 304 of circular stock. These are joined by a bracing web 303'. A handle 305 of small bar stock is set on the pin at right angles its weight tends to keep it pendant, the pin being freely revolvable for that purpose. A cross brace 306 is fixed between the legs of the drawbar parallel to the axle 227 and so located as to clear the forward edge of the platform 302 in movement of the drawbar. The pin 304 is of sufficient length to permit it to slide forward beyond the brace 306. Two circumscribing grooves 307 are formed around the rear part of the pin 304 and a flat 308 is formed on the bottom side of the pin of equal depth with the grooves. On the forward bracket 303 a keeper plate 309 is fixed, extending downward into one or the other of the grooves. The handle 305 is spaced from the forward end of the pin, so that with the keeper in the rear groove, the handle may be swung upward to vertical position behind the brace 306, bringing the flat 308 to alinement with the keeper and allowing the pin to be retracted to clear the brace, and free the draw bar. There the keeper is engaged by the forward side of the front groove and the pin is then rotated manually or by gravity acting on the handle 305 to engage the keeper in the groove distant from the flat, retaining the pin safely retracted.

*Emplacement operation*

In the emplacement of this arm it is an advantage that but little preparation of the site is required. However, as a low position of the gun has been attained, a shallow pit 270 is required to receive the breech end of the weapon on recoil; and to accommodate the spades extension excavations 271 are also required at each side. These are of a uniform plan in all emplacements and may be prepared before hand when a crane is used, but for emplacement by the winch method it is preferable that the excavation be done after setting the carriage unit in place, although a shallow outline recess of the desired plan contour may be made.

In order to facilitate the rapid orientation of the piece, a template 272 (Fig. 38) is provided formed of a sheet of canvas having the contour of one half the excavation as divided on a fore and aft medial line and this is carried as a roll, stowed in one of the wagons. The template has at one extremity a spade area 273 defined, and at the other end a half breech pit part 274 opening at the edge of the template, with end edges 275' connected by a tape or cable 275'' extending across the opening, these end edges and cable marking the medial azimuth line of the site.

In emplacement the site is preferably oriented beforehand and the azimuth of the center of the field of fire marked on the ground by a line 275, before the wagons and the units loaded thereon are brought to the site. As the wagons arrive, the template is first unloaded adjusted to the line 275, pegged at 272' and the lines for the excavation boundaries marked as stated.

Since the procedure in emplacement by crane will be obvious from the preceding description and from the procedure by the winch method, the latter only will be described.

The carriage and cannon wagons with their loads drawn by respective first and second prime movers (not shown) having arrived, the site is outlined. Then, before any excavation work, using the template as indicated, the carriage wagon is spotted by driving its prime mover in across the site from the front along the line 275 until the front truck wheels of the wagon are about at or a little short of the position for the front of the bottom carriage, and the front end cross plate 153 of the wagon frame approximately at or a little short of the plotted position for the front edge of the bottom plate 51 of the carriage. The wagon is thereby extended longitudinally in front of the final desired position of the carriage, the bottom carriage being on the distant rear end of the wagon, substantially as in Fig. 4. The first prime mover is uncoupled from the draw bar of the carriage wagon, after setting of the brakes of the wagon (not shown). The diagonal cross braces 241 and tie down bolts 110 are uncoupled, the latter being swung down to brackets on the side members and secured, as dotted in Fig. 4, and the spade jacks are retracted to clear the sockets 202 of the jack saddles 200. This leaves the carriage free of all fastenings to the wagon, the trails being elevated on the saddles 200 and prevented from side sway by the heels of the saddles resting on the sills of the frame, although abutment of the guides 108 with the bumper will also contribute to this bracing because of the repose of the unit. The legs of the rear draw bar 220 are pulled out, pivoted to the frame and connected together at the lunette 222, Fig. 37. All extensions of such air controls for brakes, wiring etc., as may be used are disconnected close within the ends of the frame, or otherwise safely disposed. The second prime mover is connected to the rear draw bar 219. Each prime mover, not shown, is assumed to be equipped with a winch.

The wagon jack is now released at the wing bolt (Figs. 22, 23) 210, and raised to jacking position with its foot set in the foot plate 218, the latter having been set on the ground slightly nearer the bottom carriage than the trunnions of the sleeve so that the gin is caused to lean toward the rear of the trails at a small angle to the vertical as indicated in Figs. 5, 6, 7. The jack cables 216 being arranged, a winch line 276 from the second prime mover is connected to the hook 217, being extended under the rear bogie of the carriage wagon 45. The winch line is tautened so as to sustain the front end of the wagon frame (which is under the rear ends of the trails) independently of the front truck wheels 169. The lever 187 (Figs. 20, 21) being freed from the pin 189 and anchor arm 188, it is raised so as to relieve the key 184 of compressive stress, then rotated ninety degrees to aline the arms of the key with the slots of the key holes 182 and then lowered to cam the key arms upward through the keyhole in the truck top plate 169'. The pins 181 and 184 may now be withdrawn from above to free the truck 160 for forward withdrawal, or (after swinging the porter bars outward) a further operation of the jack 206 by the winch may be effected, sufficient to raise the front end of the wagon frame clear of the plate 169' to clear the pin 181, the truck 160 thereby being left clear of this pin, the relation of the pilot bar 177, and engaged part of the cross members 178 permitting the necessary pivotal movement.

The porter bars (Figs. 20a to 23), now disengaged from their travel brackets 194, are lowered at their outer ends so that their furcated ends 179 will be above the knobs 193, then swung laterally to positions at right angles to the wagon, and raised so that their lug extremities 179 engage beside the knobs 193 and bear on the pins 193' and the weight of the rear truck part is sustained, while the truck is drawn forward to withdraw the pilot bar 177 from the cross member 158'. The lever 187 is now swung back ninety degrees around the axis of the key 184 and lowered to clear the space above the top of the wagon frame, the key arms being thereby drawn upward near or against the plate 156. The bracket arm 188 is also dropped so as to clear the space above the frame of the wagon.

The front truck being removed clear of the wagon (Fig. 5), the winch line 276 is fed toward the jack 206 so as to lower the front end of the wagon frame nearly to the ground. The trail ends now project longitudinally beyond the end of the wagon frame, and one of the trail floats 70 is laid transversely thereunder on the ground and a V-shaped temporary trail support 225 is set with its legs spread transversely of the line 275, its flat top in position to receive the two ends of the trails thereon. The wagon frame is lowered so as to rest on the ground, and the height of the support 225 is such as to engage the trails before completion of the lowering of the wagon frame, and hold the trails clear of the saddles 200 (Fig. 6).

The saddles 200 are now swung outward and downward on the brackets 200' clearing the top and sides of the wagon frame and then may be lifted clear of the latter and laid aside if desired. This leaves the wagon frame top clear throughout from the bottom carriage to the front end of the frame.

The line 276 is again taken up at the winch, to hoist the wagon frame—this time beyond its previous or normal travelling relation to the trails—until it engages directly the undersides of the trails, and then farther, so that the support 225 may be removed (Fig. 7).

Next, the timber mat 52 (Figs. 7, 8, 1) is arranged across the line 275 and back from the end of the wagon frame a proper distance to permit the bottom plate 51 to slide over the mat. The winch cable 276 is then paid out so as to lower the wagon frame to the ground, the top of the frame at its extremity being about level with the top of the mat 52. The cable 276 is further slacked and the jack 206 lowered to travel position and the winch line and cable slack taken up.

The first prime mover is now spotted rearwardly of the site and braked or anchored beyond the radius of the trail ends, measured from the final planned position of the bottom carriage, while its winch line 277 is extended to and hooked in one of the eyes 78 at the ends of the trails (Figs. 24, 8). The guide bars 109 are extended downwardly beside the sills of the frame at this time as they were during transportation of the unit, and it is contemplated that the several brackets, hold down bolts, etc. fixed on the sides of the frame will be low enough below the tops of the sills to clear the projecting lower ends of the bars 109. The second prime mover being braked or anchored so as to hold the wagon frame, the winch of the first prime mover is now operated to draw the carriage along the wagon frame until the bottom plate 51 is set upon the mat 52 with the front edge portion 53 and guides 108 projected forwardly beyond the mat (the guide bars 109 having been drawn upward as in Figs. 9 and 10). In this movement of the piece from the wagon, the trail ends may slide on the ground or on planks laid for the purpose. The vertical axis of the carriage and the junction of the trail extremities will both be on the medial site line 275. The wagon is now dragged by the rear draw bar and second prime mover to a position out of the way, and may have its front truck replaced by a reversal of so much of the previously described procedure as necessary, or the two left separately in readiness for reassembly with the carriage when displacement of the piece is decided on. The second prime mover may now be connected again to the draw bar of the cannon wagon.

The trail lock pin 68 is now removed, the trail ends separated and drawn apart to parallel relation as in Fig. 3 and the spacer bar 106 connected therebetween as heretofore described, after which the ramps 130 are secured in place, which may be effected by driving pins into the ground through slots 278 in the base flanges of the ramps. Each ramp may include depending parts to interfit between the side plates of the trail and over the cross plate 73 at the open upper side of the trail.

*Mounting the cannon*

The parallel trails being positioned accurately with respect to the medial azimuth plane of the bottom carriage, the top carriage is adjusted in traverse at center position on the base 50, and the rear platforms 132 swung laterally (on pivots adjacent the lug 238, Fig. 1, the details of the pivot not being illustrated out of proximity to the path of the cradle.

The mount is now in condition to receive the cannon unit and the cannon wagon is drawn by the second prime mover to position in line with and headed away from the trails and backed to position near the ramps 130, while the side rails 81 are set on the sockets 80 with the pins 80' inserted (Fig. 9), to support the rails in position slightly inclined outwardly at their upper parts. The second prime mover is disconnected from the front drawbar 257 of the cannon wagon and the maneuvering bar 268 (Figs. 33–37) attached. The second prime mover is spotted a distance in front of the carriage to clear the muzzle of the cannon when emplaced and the first prime mover held available unhitched. All accessories and auxiliaries not used in the support of the cannon unit on its wagon being removed, to convenient places, the winch line 276 from the second or front prime mover is carried rearwardly over the roller 288 in the grooved part 289 and attached to the hook 239 on the rear axle of the cannon wagon, as dotted in Fig. 9.

The anchor bolts 231 (Fig. 9), cap screws 135 (Fig. 1), and taper bolts 143 (Figs. 1, 32) being removed and top surfaces of the sills 226 being greased (as also the keys 142, their slots 134, the flats 145, and opposed faces 133 of the false cradle), and the brakes released, the cannon wagon is drawn by winch and line 276 upward along the ramp formed by the parallel trails. Six men may be used to guide the front wheels, grasping the maneuvering bar and steadying it or swinging it as may be required to steer the wheels of the front axle onto and along the trails. When the rear wheels of the wagon are close to the inner ends of the trails, the ends of the sills 226 will be a short distance rearward from the lugs 238 and at a slightly higher level but longitudinally alined, substantially as shown in Fig. 9. The muzzle of the cannon will have passed well beyond the front of the carriage and the intermediate parts of the tube are elevated and clear of all parts of the carriage structure.

The wagon coupling links 232 are now freed of the forward support flanges 235 and pulled longitudinally toward the lugs 238 of the carriage, and the clevises 233 connected by the bolts 234 to the lugs 238. The winch line 277 may then be slacked and uncoupled from the hook 239 of the bogie axle.

The jacks 255 (Figs. 13, 14, 15, 18) will be used in the next stage of emplacement and for their mounting special fittings are provided. Each trunnion bearing 116 (Figs. 16 and 17) comprises a saddle and cap bored and bushed conventionally to fit the trunnion 117, and flanged so as to be readily bolted to the side members or arms 115 of the top carriage (Figs. 4, 31) which include recesses shaped to receive the bearing. Each bearing includes an upper large ring extension 280 (Figs. 16, 17) located rearwardly of the respective arm 115 and a forward smaller coaxial ring 281, and set in these rings there is a two diameter shank 282 of a screw jack mount 283 set against the ring 280 and comprising two narrow laterally spaced bracket arms 284 having small rearwardly projecting extremities notched at top and bottom. The shank is drawn tight in the rings by a nut on its forward extremity.

At the forward part of the top carriage a heavy central forwardly projecting pair of roller bracket arms 285 (Figs. 10, 28, 31) is included as part of a gear case 286 of the elevating gearing. A heavy pin 287 is fixed across and between these brackets on which a multiple tube-receiving roller 288 is mounted, comprising a central narrow groove cable-receiving roller 289 and two lateral tube-supporting rollers 290, the latter having peripheral faces curved laterally and radially outwardly to fit the circumference of the cannon tube at respective sides, as will appear.

The jacks 255, are now put in place, each comprising a small gear box 291 (Fig. 18) having vertically elongated slots or eyes 292 at the sides to receive simultaneously therethrough the extremities of the jack support arms 284 (Fig. 17), the upper and lower edges of the eyes being adapted to engage the recessed upper and lower sides of the arms. A long screw 293 is vertically slidable through the case raised and lowered by a nut sleeve 294 and gear driven by bevel pinion 295 the shaft of which has a hand wheel and crank 296 for its operation. The jacks are interchangeable and are placed on the mounts 283 with the wheels and cranks at the outer sides by the simple insertion of the arms 284 through the eyes 292. At the lower end of each screw 293 a push-pull head piece 297 is fixed on the screw consisting of a flat member longitudinally extended from the screw having a notch 298 in its lower transverse edge to set on and fit across the top of the horizontal end portion of the jacking arm 150' (Fig. 15), so that the latter and the cradle may be pressed downward at a proper time. The head 297 has a longitudinal slot 299 in its upper part adapted alternatively to receive the end of the arm 150' therethrough at other times (Fig. 14), so that the arm and cradle may be raised and also adapted to receive ends of the frame 254 of the jack saddle 253 (Fig. 13). The upper end of the screw is enclosed by a cap case 300 of a height to accommodate the screw when fully elevated. This case part may have porting handles 301 at opposite sides.

*Final cannon placement steps*

The cannon unit is next to be moved slidingly on the cannon wagon and forwardly over the carriage to position on the false cradle. Preparations for this include removal of the anchor bolts 231 (Fig. 9) holding the legs 149 to the lugs 230 on the wagon, loosening of one of the turnbuckle sleeves 252 (Figs. 9, 12) on the cross strap 250 and removal of the strap and both hooks 251 from the tube 138 and supports 246. After this the screw jacks 255 are put in place at 116—284, (Figs. 9 and 15–18) and the jack saddle 253 (Fig. 13) adjusted under the tube 138 (the forward part of which is now over the carriage), the ends of the saddle frame 254 being inserted through the openings 299 of the screw jack heads and fitting snugly therein, so that tilting of the jack frame in the jack heads is prevented. The jacks 255 are now operated simultaneously so as to lift the muzzle end of the tube and to sustain it clear of the tube supports 246. While so sustained, the turnbuckle 249 is loosened, one screw 248 disengaged, and the members 246 tilted outwardly and downwardly so that they lie outwardly of the wagon sills, their pivots being spaced outwardly from the sills, and the supports 246 being shaped to clear the tops and sides of the sills to a substantial distance. The winch line 276 of the second prime mover is now disconnected from the wagon bogie hook 239, led over roller 288 rearwardly and connected to the cradle at the forward hook 151 on the under forward end of the true cradle 137 (Fig. 9).

The jacks 255 are now operated to lower the tube 138 until it rests on the roller 288 (see Figs. 9, 11, 28, 31), after which the saddle 253—254 and the jacks 255 are removed, the jacks being retained near at hand for further use in mounting the tube unit, but the saddle being stored until the tube is to be again transported. The winch line 277 is connected from the first prime mover spotted in front of the wagon (to the rear of the gun) to the top hook 151 on the cradle and kept taut as a hold-back.

In the lowering of the muzzle end of the tube to the roller 288 it moves below its former position on the wagon, so that it lies well down between the forward parts of the walls of the false cradle.

It should be noted that in the travelling and unloaded positions of the false cradle the road lock devices allow it to assume a position corresponding to a moderate quadrant elevation of the tube, which may be as much as twenty five degrees, more or less, as shown in Fig. 10, which somewhat more than the minimum elevation of the piece when in operation. It is also at approximately fifteen degrees elevation above quadrant angle of the tube in its present position. With the false cradle in this position as in Fig. 9, the rear ends of the cradle wall tops are far below the path of the lower ends of the keys 142 when the cannon unit is moved slidingly forward while supported by the legs 149 on the wagon sills and by the roller 288; but the forward ends of the false cradle lugs 128 are slightly above the path of the lug 144. The downwardly sloping rear end top surfaces of the sills 226 of the wagon will cause a relative lowering of the breech end of the cannon in the final forward movement of the cannon unit so that the forward lateral lugs 144 will come to rest on the tops of the false cradle walls immediately over or near the threaded holes 133'. However, it is not necessary that the cradle be given as much elevation as this, or that the lug 144 strike thereagainst as a limit to relative forward movement of the cannon unit. On the contrary, the false cradle may be at much less elevation, say zero, of normal operation, and the cannon unit may then be stopped in its forward movement with the key 142 over the slot 134 by using the rear winch line 277 opposing the one 276 as a check or stop, as described, to assure the proper stopping or adjustment of the cradle in registry with the false cradle. The turnbuckle sleeves 126 of the road lock for the false cradle perform an important function in enabling a satisfactory functioning of the parts as last mentioned, since they enable adjustment of the inclination of the cradle and relative height of the top faces of the false cradle walls and parts on the true cradle as the latter approach.

As a precautionary measure slack in the winch line 277 is now taken up and the line 276 drawn forward while the line 277 is allowed to feed forward correspondingly. As the cannot unit moves forward over the carriage the legs 149 slide on the wagon frame, and the guides 149 preserve the alinement of cradle and false cradle until the cannot unit reaches a position somewhat as shown in Fig. 10, this position not being critical, but requiring that the lower end of the key 142 shall clear the rear side of the key slot 134. The legs 149 remain on the wagon at this position (Fig. 10), supporting the breech of the piece.

With the tires of the bogie well inflated and the treads new this elevation of the key 142 will be greater than when tires are worn or soft. It is one of the advantages of the invention that a wide variation in the relative height of wagon and carriage may be compensated so as to insure this movement of the key 142 with certainty to matching position over the slot 134.

While the cannon unit is in the last described position, the jacks 255 are again mounted on the mount 283, the extremities of the jacking brackets 150 engaged through the slots 299 and the breech of the piece raised slightly while the forward part of the tube 138 is still supported on the roller 288. This lifts the legs 149 of the cradle from the wagon. The links 232 are now disconnected and the wagon lowered down the trails 60 by use of its brakes, and drawn clear of the site. The breech may now be lowered by operation of the jacks 255 so that the keys 142 move toward or partly enter the slots 134 (Fig. 11), according to the elevation angle of the false cradle. The keys will not at this time enter the slots fully even at minimum elevation of the false cradle, and in any case the cannon unit comes to rest supported by the lugs 144 resting on the forward part of the false cradle walls, and the tube resting on the roller 288. The registration of the opening in lug 144 and hole 133' being approximately assured by proper control of the opposing winches as the cannon unit comes to rest as last mentioned, the cap screw 135 may be set in the lug 144, and lowering operation of the jacks 255 continued so that the brackets 150 are pressed downward, this resulting in pushing the breech of the piece downward (the lugs 144 serving as fulcrum elements) until the keys 142 are well entered in the slots 134. If necessary, the jack heads may be readjusted to engage the notches 298 on top of the ends of the arms 150' of the jacking brackets 150. The taper stud bolts 143 are now inserted through the registered openings in the lugs 136 and 141 and drawn into alining engagement therein, after which they may be tightened to draw the cradle into tight fit with the false cradle with the keys 142 fully engaged. The cap screw 135 is now screwed in place, completing the attachment of the cannon unit to the false cradle. In the lowering of the tube 138 into the false cradle, the flats 145 on the cradle collar and the surfaces of the collar leading thereto serve to facilitate and assure good azimuth coordination of the bore axis and the traverse mechanism. The quadrant elevation relation of the tube and false cradle is effected by the lugs 141 and 144 on the tops of the walls 119, and setting of the foot lugs 141' and 144' on the steps 133a and 136a (Fig. 29). The winch lines may now be removed and the jacks and jacking arms 150' removed or loosened and moved pivotally to a safe position, and the road lock turn buckles loosened, the lower eyebolts thereof shifted from the travelling hooks 129 to the necked pins 129a, and the turnbuckles tightened. The jack mount 283 is also removed, to permit mounting of fire control devices, or for other reasons.

The side rails 81 and supporting stakes are removed, as well as the spacer bar 106. The rear platforms are swung inward and secured. The trails are now swung laterally (which may be done with a winch line connected successively to the eyes 78) until checked by the stops 85, after which the tie beam sections 96 are swung into tie positions and secured, the guide rails 100—101 being at the same time or later secured in operative position. Work on the pits 270 (Fig. 1) for the breech and the extension 271 thereof for the spades, may have been inaugurated previously and if not completed the excavation is now finished and the spades 90 set in place with the clevises 94 connected as before described. The jacks 86 are now disengaged from the travel supports, swung downward and laterally, their outer ball ends set in the ball sockets of the spades and the jacks extended to transmit thrust properly to the spades.

The trail floats 70 may be set in place beneath the extremities of the trails and secured after completion of the pits and before attachment of the spades 90.

The rear sides of the spade pits are made nearly or quite vertical and if the material excavated tends to break in during excavation it is desirable to pack dirt, gravel or trap behind the spades to the tops thereof before the jacks are fully tightened, extension of the jacks being completed afterward. The pits are preferably of a depth equal to the height of the spades.

Breech and muzzle covers being off and all desired instruments being in place, firing of the piece may be proceeded with conventionally.

*Displacement*

Operations in displacement are substantially the reverse of those for emplacement as described above, with some modification and adaptations which may appear necessary. Thus, in removing the cannon unit, before engaging the travel lock between the false cradle and carriage arms 115, the cannon is preferably moved to the proper elevation best suited to emplacement procedure previously described and it is necessary to push the carriage wagon up to the front of the carriage with the untrucked end of the frame sliding on the ground, by use of the rear draw bar 219 engaged with a primer mover; and after the carriage is drawn forward onto its wagon it is necessary to drag the wagon by the same means a distance from the pits 303—304 to enable safe and ready movement of apparatus and personnel before the front truck is again attached. The operation in Figs. 5 to 8 with the wagon jack are repeated in reverse order except that the winch line 277 is not used, the line 276 being used at 107 to load.

The mat 52 may not be required, and the carriage may be set directly on the ground in some cases or on precast concrete pillow blocks. In moving the carriage on to the wagon it may be desirable to dig out before and under the front bevelled edge of the bottom carriage to permit the tapered end of the carriage wagon to slide under the carriage readily, especially if no mat is provided.

While we have disclosed the invention in full detail in the best construction known to us, it will nevertheless be understood that this is purely exemplary, and that various modifications in structure, arrangement and combination, substitution of materials and equivalents, mechanical or otherwise may be made without departing from the spirit of the invention set forth in the appended claims.

We claim:

1. In highly mobile heavy ordnance, a piece comprising a base carriage, an upper carriage traversably mounted thereon and a gun tube pivoted on the upper carriage for elevational movement, said piece including a plurality of separable units, and interlocking devices on each two mutually engaging separable units constructed and arranged to coengage by substantial vertical relative motion after relative sliding motion of the mutually adjacent units one upon the other in a substantially horizontal path in placement and adapted to disengage by opposite relative motions.

2. The structure of claim 1 in which at least one unit is a cannon element and another a receiver therefor, and in which azimuth operative connections are connected between the receiver and lower carriage having normal coengaged relation when in firing position, and elevation connections connected between the receiver and upper carriage.

3. The structure of claim 1 in which the tube has mounted thereon a cradle and recoil mechanism coactive between the two and constituting one of said units, a cradle receiving element being included in said upper carriage trunnioned and connected with said elevation gearing for elevational movement constructed for embracing engagement with said cradle and constituting the next of said separable units, respective elements on each constructed, arranged and adapted to interlock at least against relative movement longitudinally of the tube, said units including means to hold the cradle fixed with said cradle receiving element.

4. The structure of claim 1 in which the tube has mounted thereon a cradle and recoil mechanism coactive between the two and constituting one of said units, a cradle receiving element being included in said upper carriage trunnioned and connected with said elevational movement constructed for embracing engagement with said cradle and constituting the next of said separable units, said embracing element and said cradle having one a keyway and the other a coactive key slidable in a substantially vertical path to locked position in the keyway at the operative positions of the parts.

5. The structure of claim 1 in which an uppermost unit includes the gun tube, a cradle for said tube, recoil and counter recoil means mounted on the cradle operatively connected to the latter and to the tube, the next lower unit including an elevatable cradle receiver, means to secure the latter and cradle in rigid but readily separable relation, elevating means cooperative between said upper carriage and the cradle receiver, and traverse mechanism operative between the base carriage and upper carriage.

6. The structure of claim 1 in which an uppermost unit includes the gun tube, a cradle for said tube, recoil and counter recoil means mounted on the cradle operatively connected to the latter and to the tube, the next lower unit including an elevatable cradle receiver, means to secure the latter and cradle in rigid but readily separable relation, elevating means cooperative between said upper carriage and the cradle receiver, and traverse mechanism operative between the base carriage and upper carriage, an equilibrator connected between the cradle receiver and said upper carriage comprising an elastic support between the forward part of the receiver and the upper carriage constructed and adapted to oppose and counter balance unbalanced gravitational forces of a tube and cradle mounted in said receiver.

7. In an elevatable gun mount, a carriage, a cannon cradle device elevatably trunnioned thereon, an equilibrator comprising a cylinder and a piston pivotally connected, one to the carriage and the other to the cradle device, both eccentric to the trunnion axis and a pressure gas reservoir having duct connection with the cylinder: characterized by the provision of the duct connection of the cylinder to open between the piston and that end of the cylinder which is toward the connection of the piston and carriage, and by the location of the pivotal connection with the carriage advanced from the radius of the pivotal connection between the cradle and equilibrator in the direction of movement of the latter connection in elevating movement of the cradle on its trunnions.

8. A natural grade earth-based mount for a traversible cannon comprising a carriage body adapted to be set upon a support surface, two buttress members extended divergently therefrom in symmetrical angular relation to a mean azimuth line beyond limits of traverse of the cannon, the extremities of said members having vertical force transmitting engagement with the earth, and earth-embedded horizontal thrust-transmitting members located intermediately of the horizontal reach of said buttress members and operatively connected to the latter, the connector last named including an extensible jack.

9. The structure of claim 8 in which said thrust-transmitting members include thrust links extended divergently downward and rearwardly beside each buttress member and outward from the carriage, and including broadened foot pieces set below the earth surface.

10. In a weapon of the character described, a base carriage having pivoted wide-base buttress members and a cannon traversably mounted thereon having a breech traversable between the vertical planes of the buttress members, and means to connect the buttress members in mutual rigid relation in firing positions, including a rail element substantially concentric with the axis of traverse of the cannon, a loading trough having one end adapted to engage for support in the breech when open, its opposite end being engaged slidably on the rail.

11. The structure of claim 10 in which said means to connect the buttress members comprises separable rail and link parts pivotally mounted on respective buttress members, and means to support the link members releasably close against the buttress members.

12. In a mobile heavy cannon, mount and recoil, a carriage having a trunnion-mounted cradle receiver, a resilient counterbalance for unbalanced weight of a cannon to be mounted thereon whereby said receiver is initially elevated at its forward part, a cannon, a cradle therefor carrying the cannon, said receiver having top longitudinal edge parts and rearwardly located key slots opening upwardly at each side, said cradle having lateral lugs arranged to engage over said edges, key devices on the cradle positioned to pass over the rear top edge of said receiver to aline with respective said key slots when said lugs are engaged on the forward top edges of the receiver, means to support the forward end portion of the cannon for sliding movement of the cannon forwardly from a rear position to aline said keys and key slots, means to press the cannon and receiver downward for entry of said keys in to said keyslots when alined, and means to connect the receiver and cradle in rigid coengagement.

13. In a gun mounting of the character described, a carriage having a false cradle thereon, an equilibrator on the carriage for counterbalancing high unbalanced barrel weight engaged with said false cradle, releasable means to limit movement of the false cradle by the equilibrator, a tube and true cradle unit constructed and arranged for mounting in said false cradle by an upward and then a downward movement of the breach end of the unit, a tube support forwardly of the false cradle on the carriage, a jack constructed with an extensible and retractable element for pushing and pulling the rear of the tube and cradle unit vertically, a furcated bracket on the carriage at the rear part adjacent and above the position of the breech end of the tube unit, said jack having openings through the body thereof spaced and shaped to receive the furcations of said bracket therethrough said tube unit having parts to engage the extensible and retractable element of the jack.

14. In a gun mounting of the character described, a carriage having a false cradle thereon, an equilibrator on the carriage for counterbalancing high unbalanced barrel weight engaged with said false cradle, releasable means to limit movement of the false cradle by the equilibrator, a tube and true cradle unit constructed and arranged for mounting in said false cradle by an upward and then a downward movement of the breech end of the unit, a tube support forwardly of the false cradle on the carriage, a jack constructed with an extensible and retractable element arranged for pushing and pulling the rear of the tube and cradle unit vertically mounted on the carriage and a separable connection between the tube and cradle unit and the false cradle.

15. In a mobile heavy armament ordnance, a mount, an elevatable barrel unit receiver, a barrel unit removably set therein, a counterbalancing device connected between the receiver and the mount tending to elevate the receiver against an otherwise unbalanced force equal to a substantial part of the weight of the muzzle end of the barrel, separable fastening between the mount and receiver to hold the latter at a predetermined elevation, and releasable means to secure the barrel unit to said receiver.

THOS. A. CONLON.
TREVOR O. DAVIDSON.
ALLAN R. TAYLOR.
HARRY E. RICHARDSON.
HUGO A. RINIKER.
HORACE C. BEITZEL.

REFERENCES CITED

The following references are of record in the file of this patent:

UNITED STATES PATENTS

| Number | Name | Date |
| --- | --- | --- |
| 737,972 | Smythe | Sept. 1, 1903 |
| 974,552 | Cartwright | Nov. 1, 1910 |
| 1,090,077 | Lauber | Mar. 10, 1914 |
| 1,128,591 | Dawson et al. | Feb. 16, 1915 |
| 1,167,673 | Bourdelles | Jan. 11, 1916 |
| 1,188,829 | Rabba | June 27, 1916 |
| 1,310,142 | Schneider | July 15, 1919 |
| 1,310,883 | Schneider | July 22, 1919 |
| 1,312,037 | Lee | Aug. 5, 1919 |
| 1,345,891 | Schneider | July 6, 1920 |
| 1,345,892 | Schneider | July 6, 1920 |
| 1,429,540 | Schneider | Sept. 19, 1922 |
| 1,460,420 | Joyce | July 3, 1923 |
| 1,576,963 | Froelich et al. | Mar. 16, 1926 |
| 1,620,852 | Zimmerman | Mar. 15, 1927 |
| 1,672,146 | Barnes | June 5, 1928 |
| 1,917,994 | Osip et al. | July 11, 1933 |
| 1,990,952 | Methlin | Feb. 12, 1935 |

FOREIGN PATENTS

| Number | Country | Date |
| --- | --- | --- |
| 331,116 | Germany | Dec. 31, 1920 |

OTHER REFERENCES

"Handbook of 8-Inch Railway Gun Material," April 12, 1918, War Department, Document No. 799.